United States Patent
Sterman et al.

(10) Patent No.: US 10,631,590 B2
(45) Date of Patent: Apr. 28, 2020

(54) FOOTWEAR ARCH SUPPORT

(71) Applicant: NIKE, Inc., Beaverton, OR (US)

(72) Inventors: Yoav Sterman, Portland, OR (US);
Todd Anthony Waatti, Battleground, WA (US)

(73) Assignee: NIKE, Inc., Beaverton, OR (US)

( * ) Notice: Subject to any disclaimer, the term of this patent is extended or adjusted under 35 U.S.C. 154(b) by 207 days.

(21) Appl. No.: 15/448,973

(22) Filed: Mar. 3, 2017

(65) Prior Publication Data

US 2017/0258176 A1     Sep. 14, 2017

Related U.S. Application Data

(60) Provisional application No. 62/305,326, filed on Mar. 8, 2016.

(51) Int. Cl.
*A43B 7/14* (2006.01)
*A43B 17/00* (2006.01)
*B33Y 80/00* (2015.01)

(52) U.S. Cl.
CPC .............. *A43B 7/142* (2013.01); *A43B 7/141* (2013.01); *A43B 7/149* (2013.01); *A43B 17/006* (2013.01); *B33Y 80/00* (2014.12)

(58) Field of Classification Search
CPC ......... A43B 7/142; A43B 7/149; A43B 7/141; A43B 17/006; A43B 7/1445; A43B 17/02; A43B 3/26; B33Y 80/00
USPC ............................................................ 36/91
See application file for complete search history.

(56) References Cited

U.S. PATENT DOCUMENTS

| | | | |
|---|---|---|---|
| 717,523 A | | 1/1903 | Arrowsmith |
| 741,826 A | * | 10/1903 | Phelps ................... A43B 7/142 36/167 |
| 748,553 A | | 12/1903 | Arrowsmith |
| 881,974 A | | 3/1908 | Toporczer |
| 1,103,463 A | * | 7/1914 | Arrowsmith ........... A43B 7/142 36/181 |
| 1,346,444 A | | 7/1920 | Darling |
| 1,490,991 A | | 4/1924 | Tilson et al. |

(Continued)

FOREIGN PATENT DOCUMENTS

| | | | | |
|---|---|---|---|---|
| DE | | 233603 | 4/1911 | |
| DE | | 233603 C | * 4/1911 | ............. A43B 7/142 |

(Continued)

OTHER PUBLICATIONS

"Premium Orthotic Gel High Arch Support Insoles, Gel Heel Pad, 3D Arch Support Plantar Fasciitis Supports," Amazon, amazon.co.uk, ASIN: B00JI7MAMM, accessed: Nov. 2015, <http://www.amazon.co.uk/Premium-Orthotic-Support-Fasciitis-Supports/dp/B00JI7MAMM> 5 pages.

(Continued)

*Primary Examiner* — Khoa D Huynh
*Assistant Examiner* — Aiying Zhao
(74) *Attorney, Agent, or Firm* — Banner & Witcoff, Ltd.

(57) ABSTRACT

An arch support may include a base plate having a base plate top surface. The arch support may further include a contoured arch plate attached to the base plate at a joint. The arch plate may include an arch plate bottom surface. The arch plate bottom surface may face and be separated from the base plate top surface, with an extent of the separation increasing toward a medial side of the arch support.

14 Claims, 22 Drawing Sheets

(56) References Cited

U.S. PATENT DOCUMENTS

| | | | | |
|---|---|---|---|---|
| 1,696,786 | A | * | 12/1928 | Wood .................... A43B 7/142 36/168 |
| 1,741,340 | A | | 12/1929 | Scholl |
| 1,824,176 | A | | 9/1931 | Stemmons |
| 2,022,247 | A | * | 11/1935 | Lobel .................... A43B 7/142 36/168 |
| 2,043,396 | A | | 6/1936 | Schnellbacher |
| 2,063,625 | A | * | 12/1936 | Rigandi ................. A43B 7/142 36/181 |
| 2,070,814 | A | | 2/1937 | Stemmons |
| 2,188,182 | A | * | 1/1940 | Gould .................. A43B 7/1495 36/170 |
| 2,193,174 | A | * | 3/1940 | Knupp .................. A43B 7/142 36/162 |
| 2,672,698 | A | | 3/1954 | Watson |
| 2,698,490 | A | * | 1/1955 | Goldman ............... A43B 3/128 36/172 |
| 2,716,295 | A | | 8/1955 | Stein |
| 4,045,886 | A | | 9/1977 | Terasaki |
| 5,138,774 | A | * | 8/1992 | Sarkozi .................... A43B 7/14 36/159 |
| 7,707,751 | B2 | | 5/2010 | Avent et al. |
| 2004/0040183 | A1 | * | 3/2004 | Kerrigan .............. A43B 3/0063 36/144 |
| 2009/0025254 | A1 | | 1/2009 | Smith |
| 2011/0302805 | A1 | | 12/2011 | Vito |
| 2012/0233877 | A1 | | 9/2012 | Swigart |
| 2012/0323724 | A1 | | 12/2012 | Luthi et al. |
| 2013/0160331 | A1 | | 6/2013 | Burke et al. |
| 2013/0219744 | A1 | | 8/2013 | Case et al. |
| 2014/0165424 | A1 | | 6/2014 | Torrance et al. |
| 2014/0259751 | A1 | * | 9/2014 | Stevick .................. A43B 7/142 36/43 |

FOREIGN PATENT DOCUMENTS

| | | | | |
|---|---|---|---|---|
| DE | 8131084 | U1 | | 3/1982 |
| EP | 2989920 | A1 | | 3/2016 |
| GB | 191124914 | A | * | 3/1912 ............ A43B 7/142 |
| GB | 2508204 | A | | 5/2014 |
| WO | 2004086894 | A1 | | 10/2004 |
| WO | 2007037581 | A1 | | 4/2007 |
| WO | 2011019130 | A1 | | 2/2011 |
| WO | 2015112471 | A1 | | 7/2015 |

OTHER PUBLICATIONS

Grannygear, "A Tale of Two Shoes: Shimano SH-XC90 & SH-XC30", twentynineinches.com, Nov. 22, 2013, <http://twentynineinches.com/2013/11/22/tale-two-shoes-shimano-sh-xc90-sh-xc30/>, 6 pages.
"Insole Z-Fit® Custom Arch", ZCoil®, zoil.com, Item# FP-CAI01, Apr. 30, 2013, <https://web.archive.org/web/20140430081339/http://www.zcoil.com/products/insole-z-fit-custom-arch/>, 4 pages.
International Search Report and Written Opinion in PCT/US2017/020945 dated May 9, 2017.

* cited by examiner

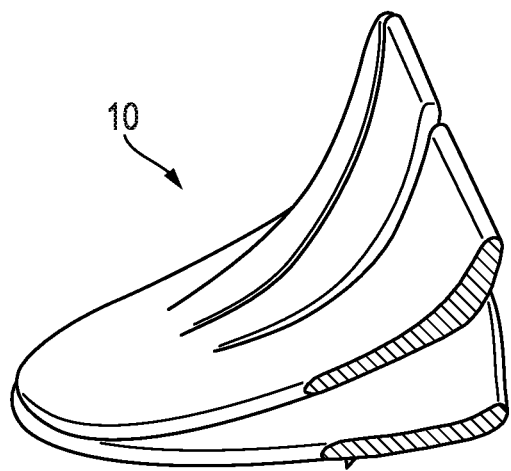
FIG. 9A1
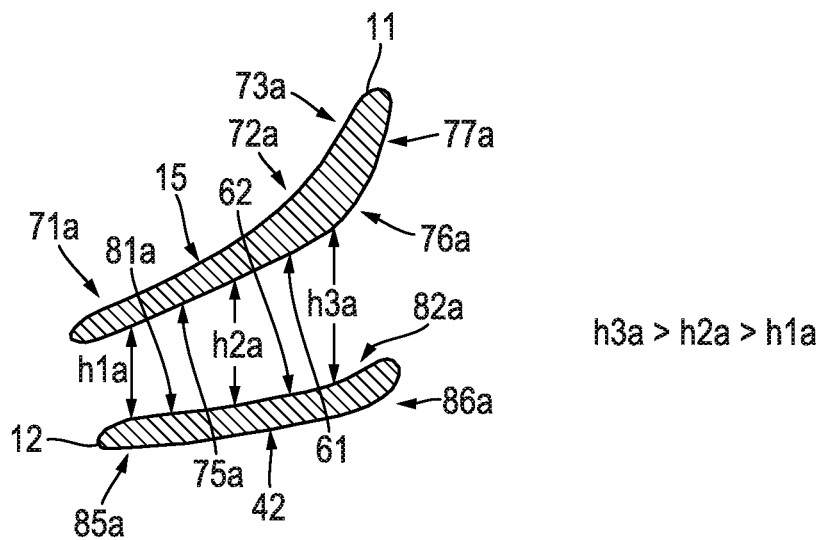
h3a > h2a > h1a
FIG. 9A2

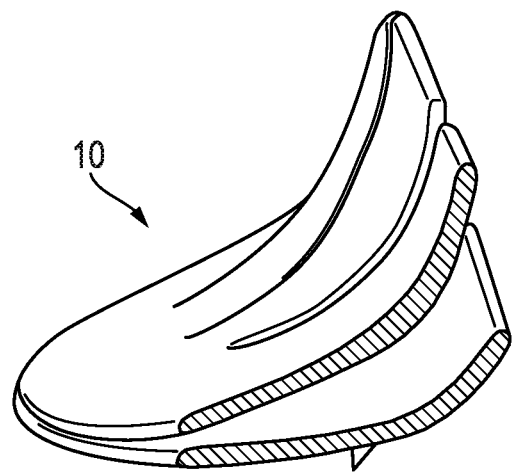
FIG. 9B1
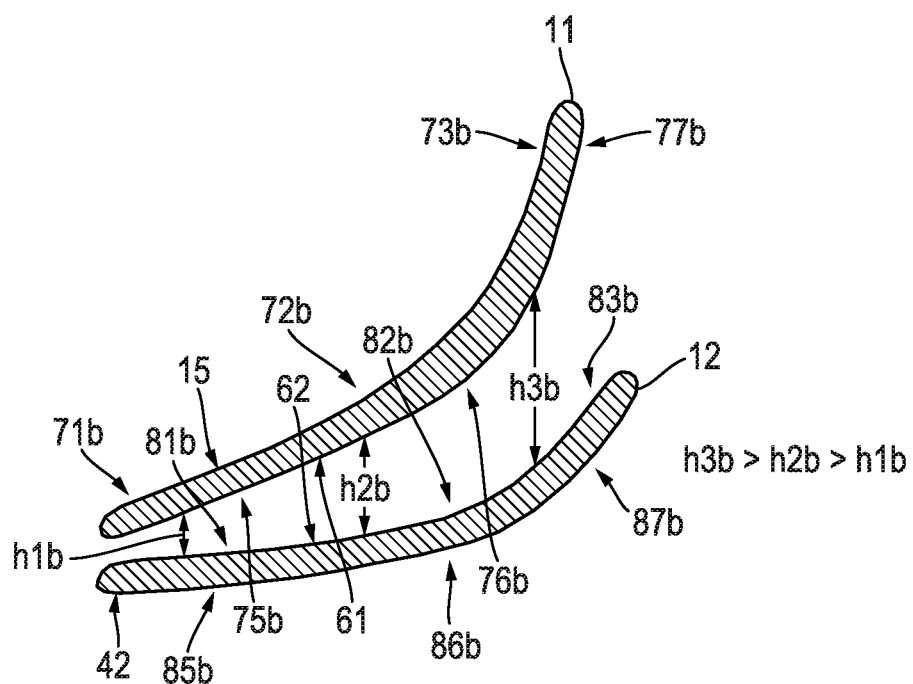
FIG. 9B2

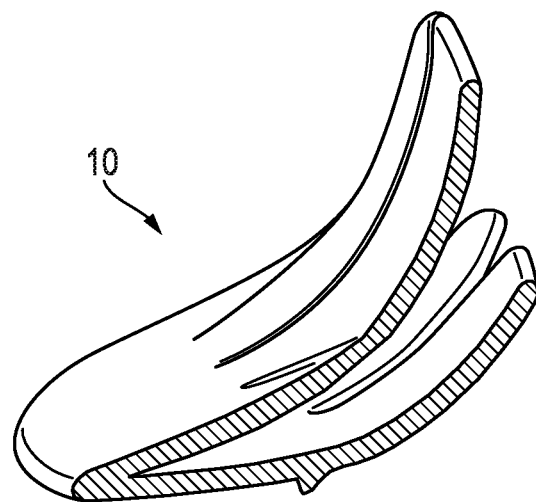
FIG. 9C1
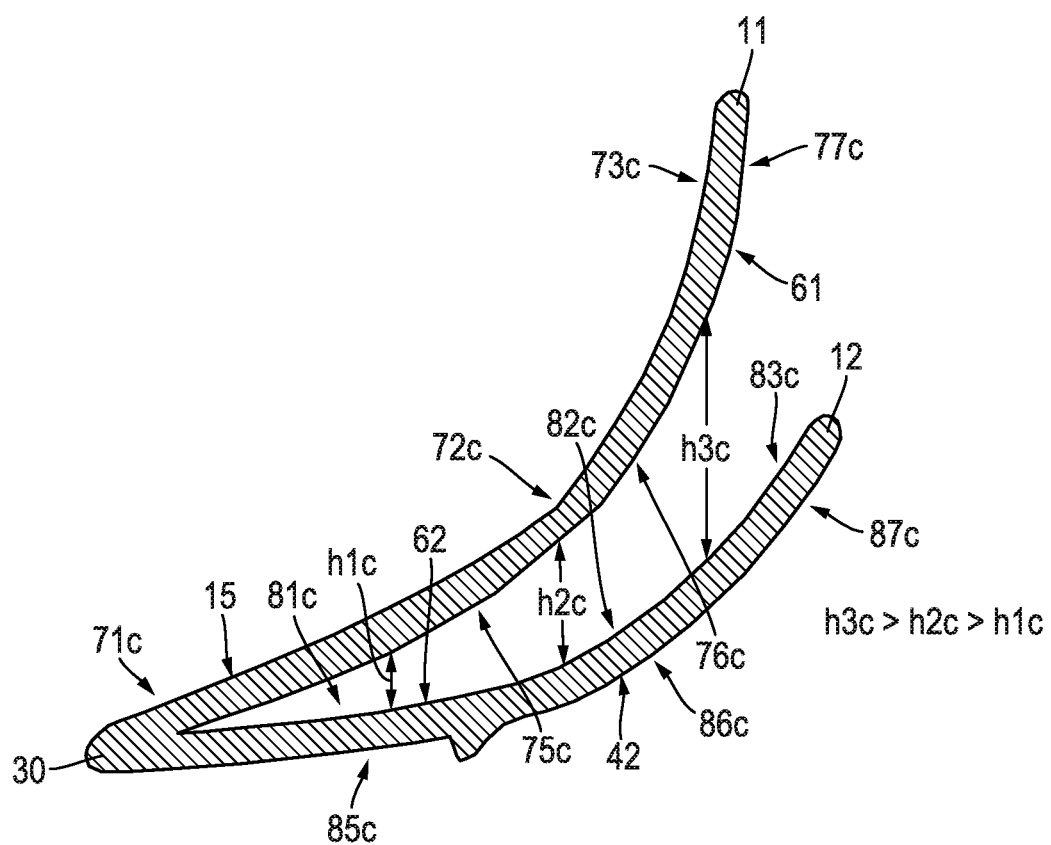
h3c > h2c > h1c
FIG. 9C2

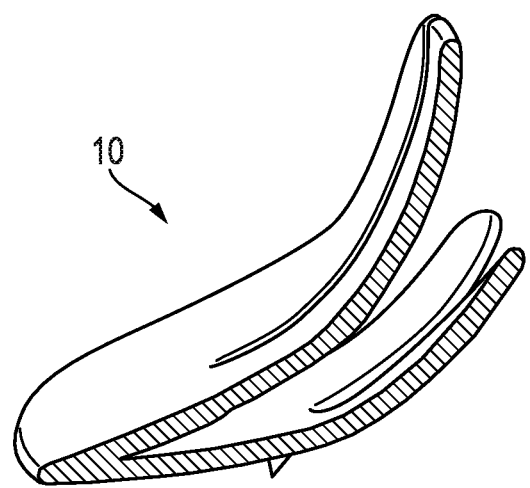
FIG. 9D1
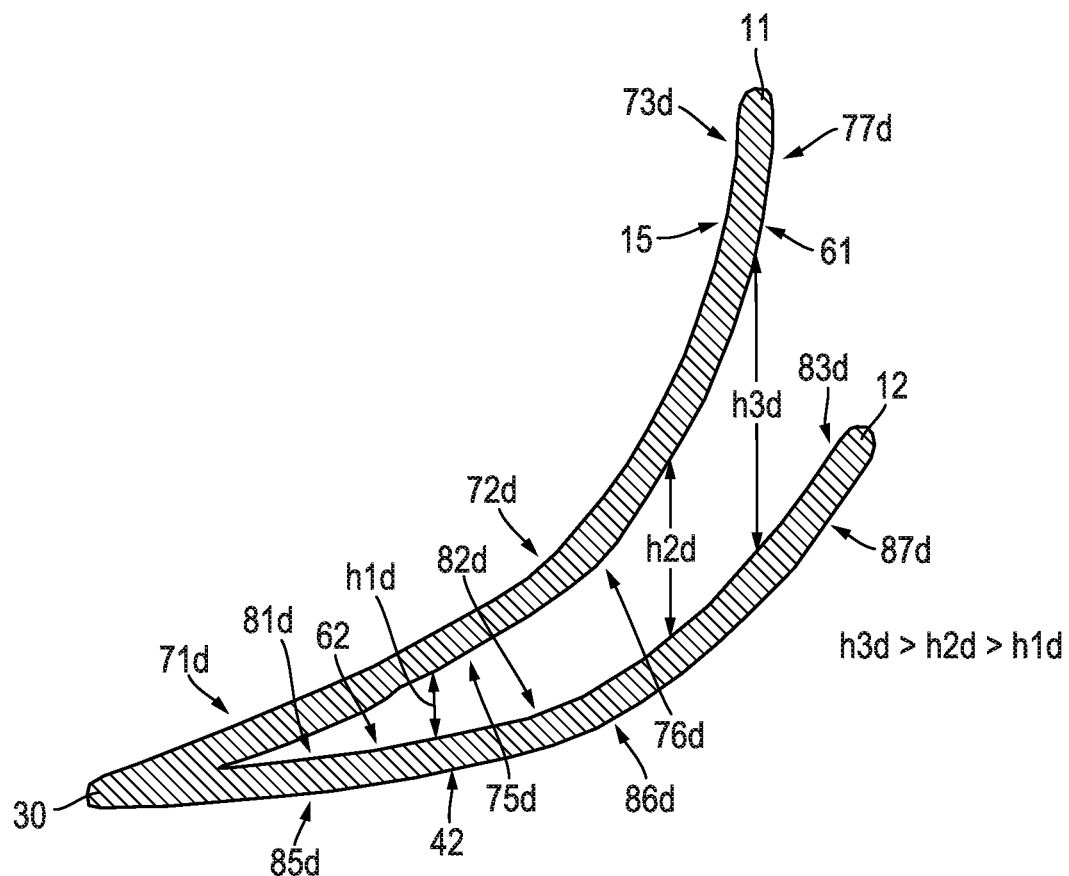
FIG. 9D2

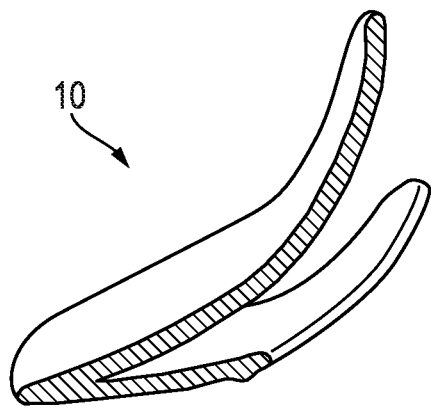
FIG. 9E1
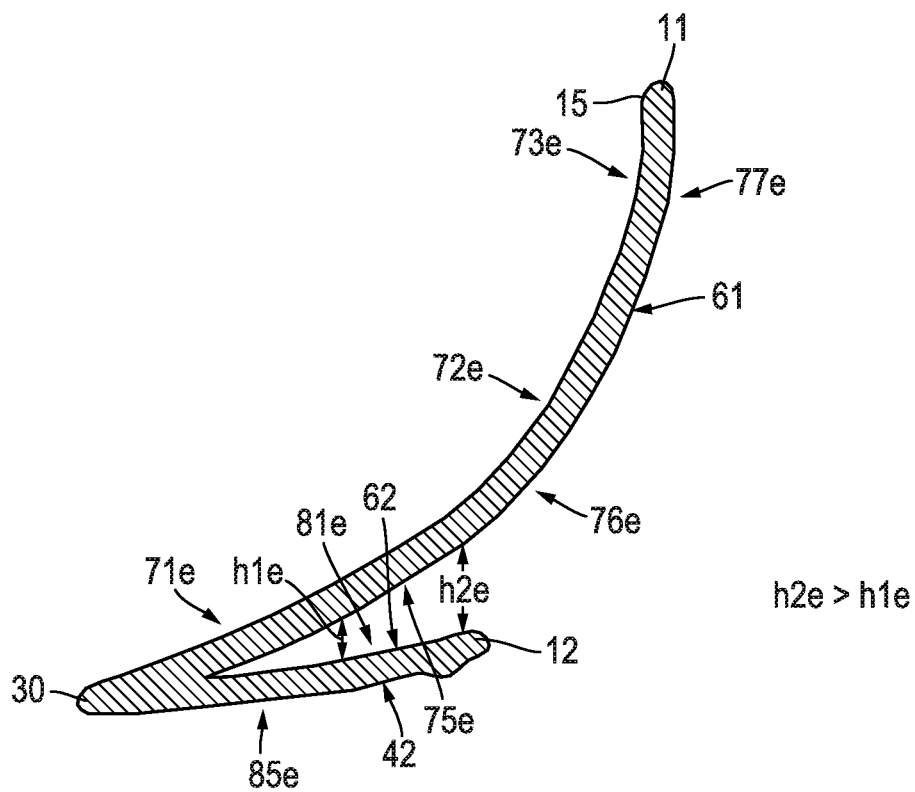
h2e > h1e
FIG. 9E2

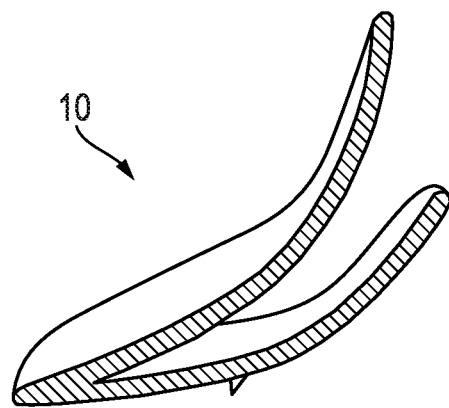
FIG. 9F1
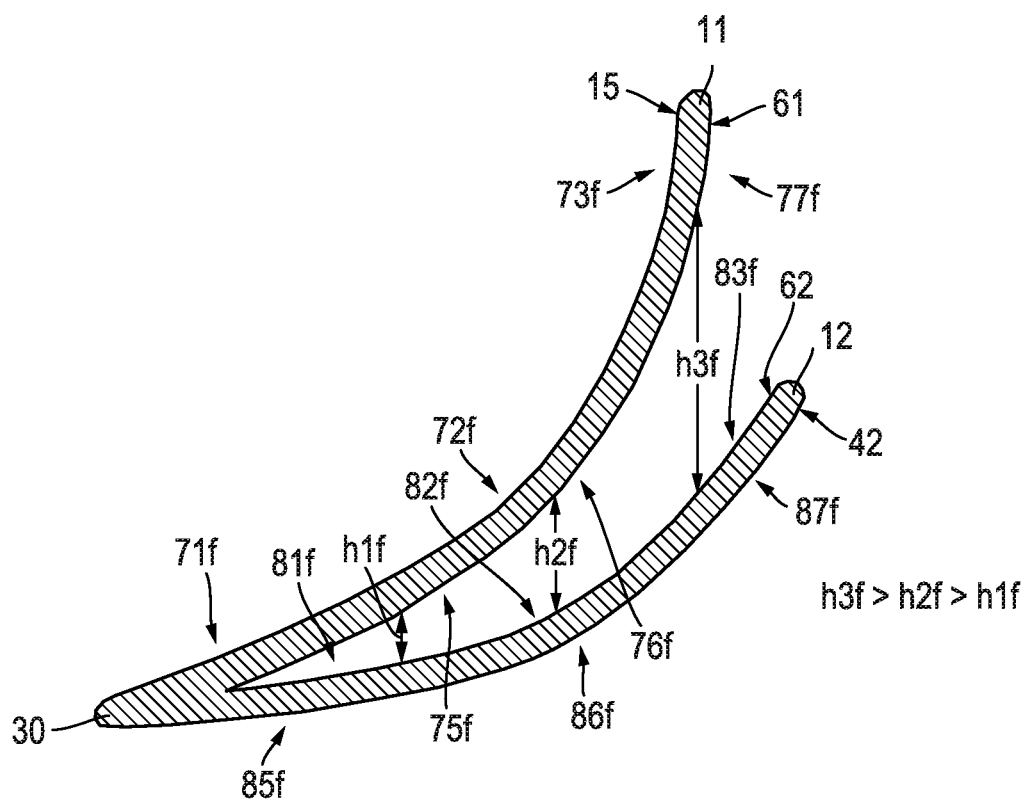
FIG. 9F2

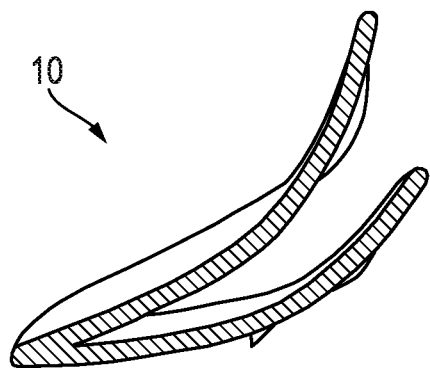
FIG. 9G1
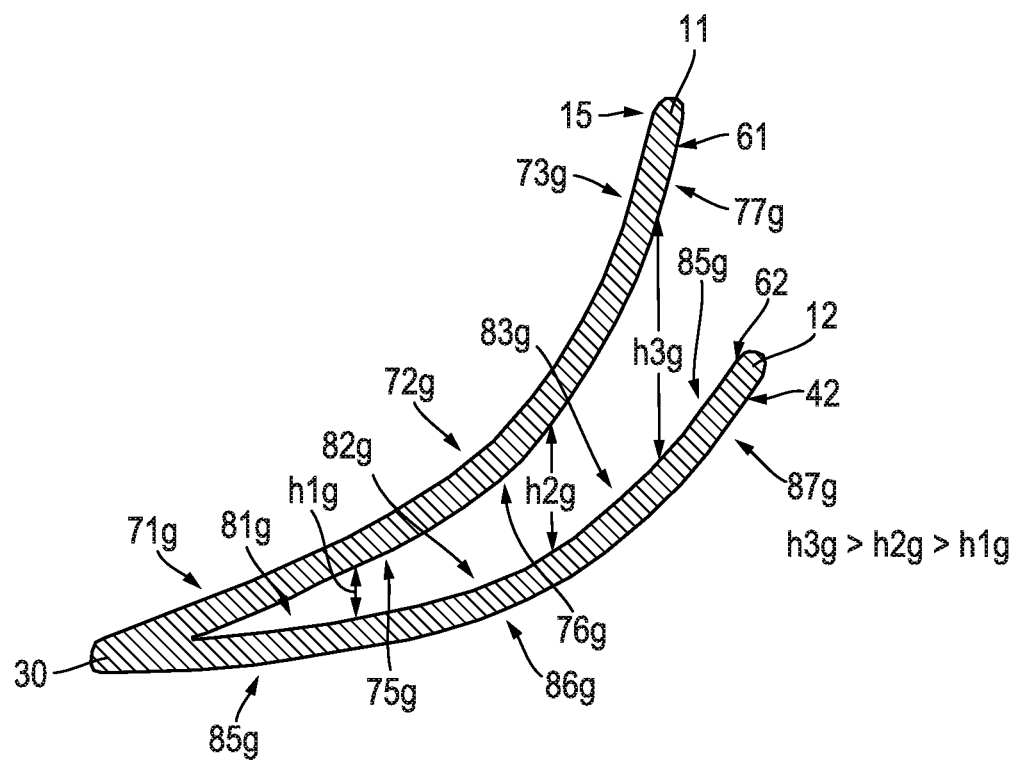
FIG. 9G2

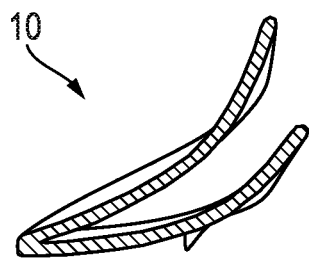
FIG. 9H1
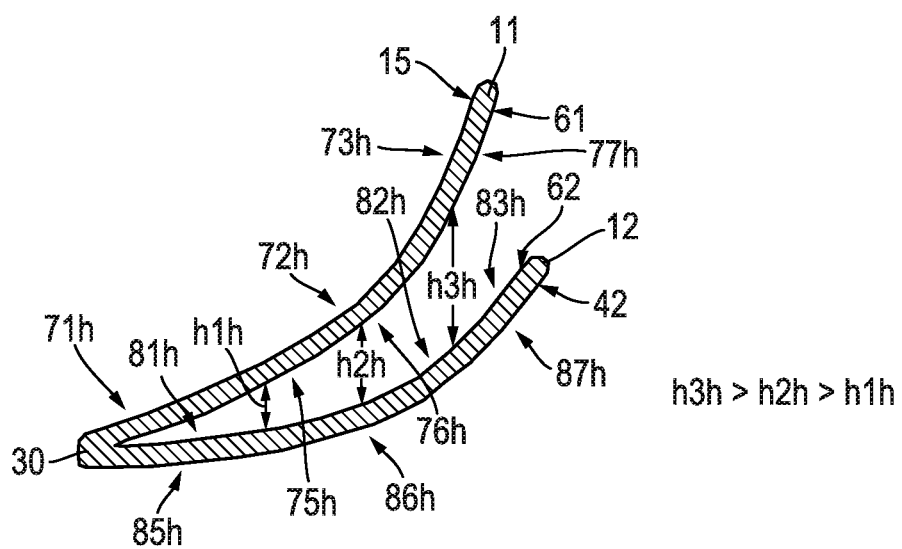
h3h > h2h > h1h
FIG. 9H2

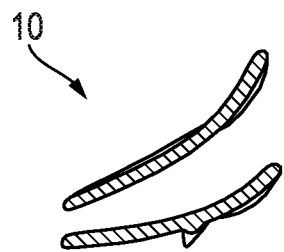
FIG. 9I1
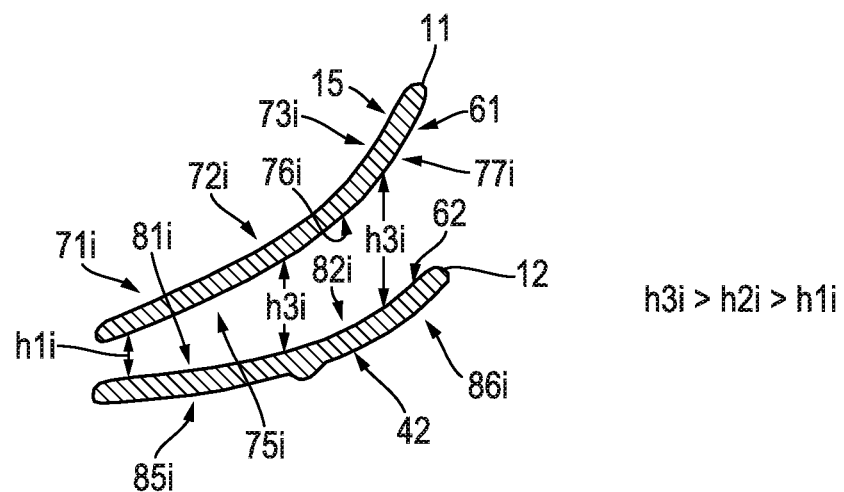
h3i > h2i > h1i
FIG. 9I2

FOOTWEAR ARCH SUPPORT

CROSS REFERENCE TO RELATED APPLICATION

This application claims priority to U.S. provisional patent application No. 62/305,326, titled "Footwear Arch Support" and filed Mar. 8, 2016. Application No. 62/305,326, in its entirety, is incorporated by reference herein.

BACKGROUND

Conventional articles of footwear generally include an upper and a sole structure. The upper provides a covering for the foot and securely positions the foot relative to the sole structure. The sole structure is secured to the upper and is configured so as to be positioned between the foot and the ground when a wearer is standing, walking or running. For a given footwear design, individual shoes conforming to that design may be available in a wide range of sizes to accommodate different sizes of intended wearers' feet. Moreover, many footwear designs include laces, straps, or other elements that allow some degree of adjustment for an individual wearer.

Orthotics and other inserts are sometimes used to further customize the fit of a shoe for a particular wearer's foot and/or to provide additional support. One foot region that frequently requires additional support is the arch, and various types of arch supports have been developed. However, economically creating durable arch supports and incorporating such supports into shoes remains a challenge.

BRIEF DESCRIPTION OF THE DRAWINGS

Some embodiments are illustrated by way of example, and not by way of limitation, in the figures of the accompanying drawings and in which like reference numerals refer to similar elements.

FIGS. 9A1 and 9A2 are a cross-sectional view and an enlarged area cross-sectional view, respectively, taken from the location indicated as 9A-9A in FIG. 4.

FIGS. 9B1 and 9B2 are a cross-sectional view and an enlarged area cross-sectional view, respectively, taken from the location indicated as 9B-9B in FIG. 4.

FIGS. 9C1 and 9C2 are a cross-sectional view and an enlarged area cross-sectional view, respectively, taken from the location indicated as 9C-9C in FIG. 4.

FIGS. 9D1 and 9D2 are a cross-sectional view and an enlarged area cross-sectional view, respectively, taken from the location indicated as 9D-9D in FIG. 4.

FIGS. 9E1 and 9E2 are a cross-sectional view and an enlarged area cross-sectional view, respectively, taken from the location indicated as 9E-9E in FIG. 4.

FIGS. 9F1 and 9F2 are a cross-sectional view and an enlarged area cross-sectional view, respectively, taken from the location indicated as 9F-9F in FIG. 4.

FIGS. 9G1 and 9G2 are a cross-sectional view and an enlarged area cross-sectional view, respectively, taken from the location indicated as 9G-9G in FIG. 4.

FIGS. 9H1 and 9H2 are a cross-sectional view and an enlarged area cross-sectional view, respectively, taken from the location indicated as 9H-9H in FIG. 4.

FIGS. 9I1 and 9I2 are a cross-sectional view and an enlarged area cross-sectional view, respectively, taken from the location indicated as 9I-9I in FIG. 4.

DETAILED DESCRIPTION

Figure 1:
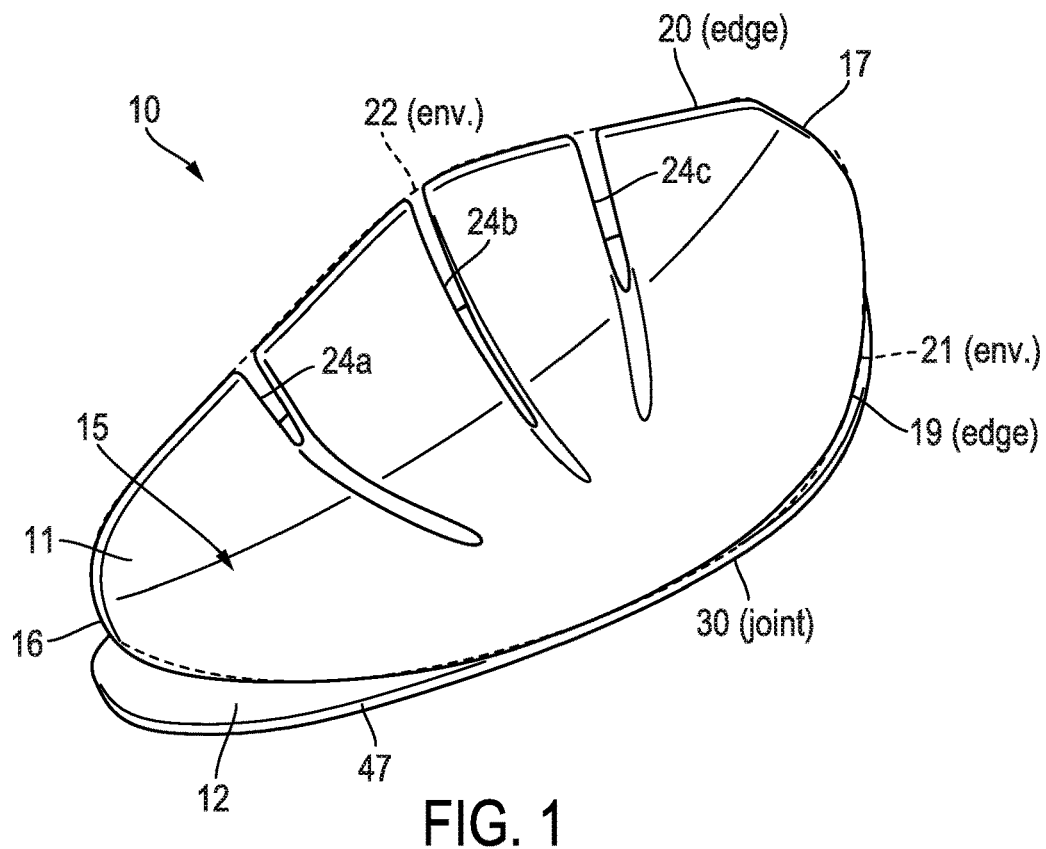
FIG. 1 is a lateral side, top rear perspective view of a right foot arch support according to some embodiments.

In some embodiments, an arch support may include a base plate having a base plate top surface. The arch support may further include a contoured arch plate attached to the base plate at a joint. The arch plate may include an arch plate bottom surface. The arch plate bottom surface may face and be separated from the base plate top surface, with an extent of the separation increasing toward a medial side of the arch support opposite the joint. The arch plate bottom surface may extend away from its lateral edge and toward its medial edge forms an acute angle relative to the base plate top surface.

Embodiments further include a sock liner incorporating an arch support, a shoe incorporating an arch support, and a method of fabricating an arch support. Additional embodiments are described herein.

To assist and clarify subsequent description of various embodiments, various terms are defined herein. Unless context indicates otherwise, the following definitions apply throughout this specification (including the claims). "Shoe" and "article of footwear" are used interchangeably to refer to an article intended for wear on a human foot. A shoe may or may not enclose the entire foot of a wearer. For example, a shoe could be a sandal or other article that exposes large portions of a wearing foot.

Shoe elements can be described based on regions and/or anatomical structures of a human foot wearing that shoe, and by assuming that the interior of the shoe generally conforms to and is otherwise properly sized for the wearing foot. A forefoot region of a foot includes the phalanges, as well as the heads and bodies of the metatarsals. A forefoot element of a shoe is an element having one or more portions located under, over, to the lateral and/or medial side of, and/or in front of a wearer's forefoot (or portion thereof) when the shoe is worn. A midfoot region of a foot includes the cuboid, navicular, and cuneiforms, as well as the bases of the metatarsals. A midfoot element of a shoe is an element having one or more portions located under, over, and/or to the lateral and/or medial side of a wearer's midfoot (or portion thereof) when the shoe is worn. A heel region of a foot includes the talus and the calcaneus. A heel element of a shoe is an element having one or more portions located under, to the lateral and/or medial side of, and/or behind a wearer's heel (or portion thereof) when the shoe is worn. The forefoot region may overlap with the midfoot region, as may the midfoot and heel regions.

For purposes of directions used to describe a shoe, it is assumed that surfaces of that shoe's sole structure that are intended for ground contact are resting on a horizontal reference plane. It is further assumed that studs or other projections from a bottom side of a sole structure do not penetrate that reference plane, and that the shoe is not deformed. A forward direction is toward the toe. A rearward direction is toward the heel. An upward direction is away from the reference plane. A downward direction is toward the reference plane. With regard to an arch support or other shoe component, directions assume that the component has the orientation it would have when incorporated into the shoe.

With regard to anatomy of a foot, sagittal planes divide medial and lateral portions of a foot. A central sagittal plane passes vertically through a foot centerline that runs from the heel and between the second and third toes. Other sagittal planes are parallel to the central sagittal plane. A transverse plane is orthogonal to sagittal planes and divides top and bottom portions of a foot. A frontal plane divides front and rear portions of a foot and is orthogonal to sagittal planes and to transverse planes. When sagittal, transverse, and frontal planes are referenced herein when describing an arch support or other shoe component, it is assumed that the arch support or other component is oriented as it would be oriented when installed in a shoe, and that the sagittal, transverse, and frontal planes are relative to where a central sagittal plane would be positioned if the shoe was worn by a foot for which the shoe is sized.

As used herein, "arch" refers to the medial side plantar region of a foot located under at least the proximal portions of the first and second metatarsals, the medial and intermediate cuneiforms, and an anterior portion of the navicular. An arch may extend further forward, further toward the lateral side, and/or further rearward.

Figure 2:
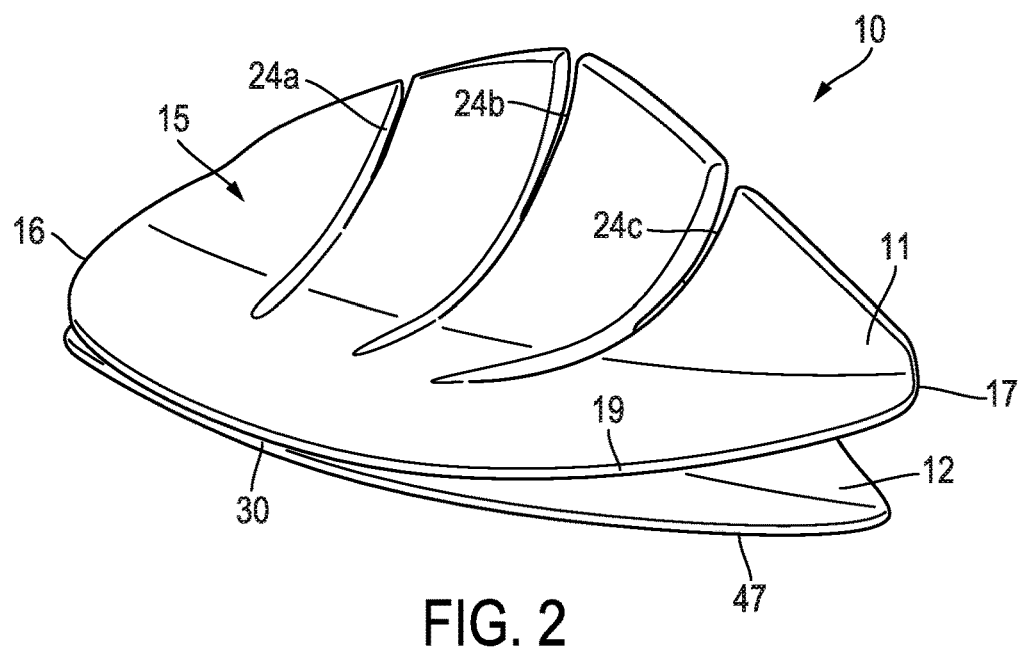
FIG. 2 is a lateral side, top front perspective view of the arch support from FIG. 1.

FIG. 1 is lateral side, top rear perspective view of an arch support 10 according to some embodiments. FIG. 2 is a lateral side, top front perspective view of arch support 10. Arch support 10 is configured for use in a right foot shoe. An arch support configured for wear in a left foot shoe may, but need not necessarily, be a mirror image of arch support 10. For example, arch supports according to some embodiments may be specially created for a particular individual. In some cases, a right arch support may differ from a left arch support based on differences between an individual's right and left feet.

Arch support 10 includes an arch plate 11 and a base plate 12. Arch plate 11 has a top surface 15, a rear end 16, and a front end 17. The lateral side of arch plate 11 terminates in a curved lateral edge 19 that extends from front end 17 to rear end 16. The medial side of arch plate 11 terminates in an upwardly-turned medial edge 20 that extends between front end 17 and rear end 16. Arch plate 11 and bottom plate 12 are attached at a joint 30 located in a middle portion of lateral edge 19 and of a lateral edge 47 of base plate 12. In the embodiment of arch support 10, joint 30 does not extend along the entirety of lateral edge 19 or of lateral edge 47. Portions of lateral edge 19 and of lateral edge 47 forward of joint 30 are not attached. Similarly, portions of lateral edge 19 and of lateral edge 47 rearward of joint 30 are not attached.

For convenience, a distinction is made herein between an edge and an envelope of that edge. An edge of arch plate 11 or of base plate 12 refers to a physical boundary defined by the end of material forming that plate. In the case of arch plate 11, medial edge 20 includes features such as the sides of slots 24a, 24b, and 24c, which slots are further discussed below. An envelope of an edge is a continuous path that follows at least some of that edge, but that bridges slots or other openings that project inward into the body of a plate (e.g., slots 24a, 25b, 24c). Because lateral edge 19 does not include such openings, the envelope 21 of edge 19 is coincident with edge 19. However, medial edge 20 has an envelope 22 that spans openings of slots 24a, 24b, and 24c.

Figure 3:
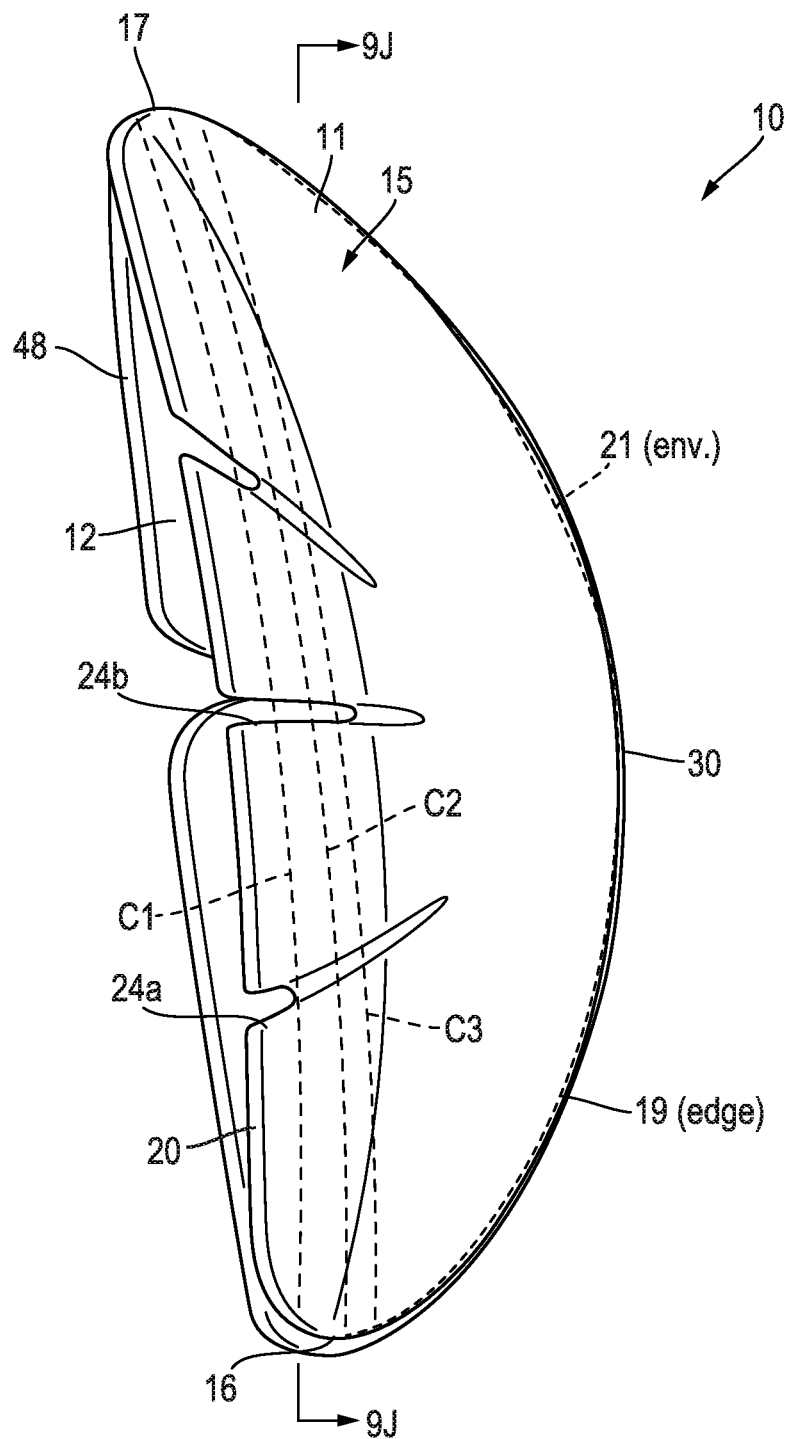
FIG. 3 is a top view of the arch support from FIG. 1.

FIG. 3 is a top view of arch support 10. Envelope 21 of lateral edge 19 is bowed and convex on the lateral side. In FIG. 3, and as can be further appreciated below in connection with discussion of FIG. 10, arch support 10 is oriented as it would be when installed in a sock liner, and with that sock liner oriented with its front and rear ends respectively corresponding to the top and bottom of the page. FIG. 3 is also a view of arch support 10 in a transverse plane. Contours of top surface 15 in various transverse planes passing through arch support 10 are similarly bowed and convex toward the lateral side. Several representative contours are indicated in FIG. 3 as broken lines C1-C3.

Figure 4:
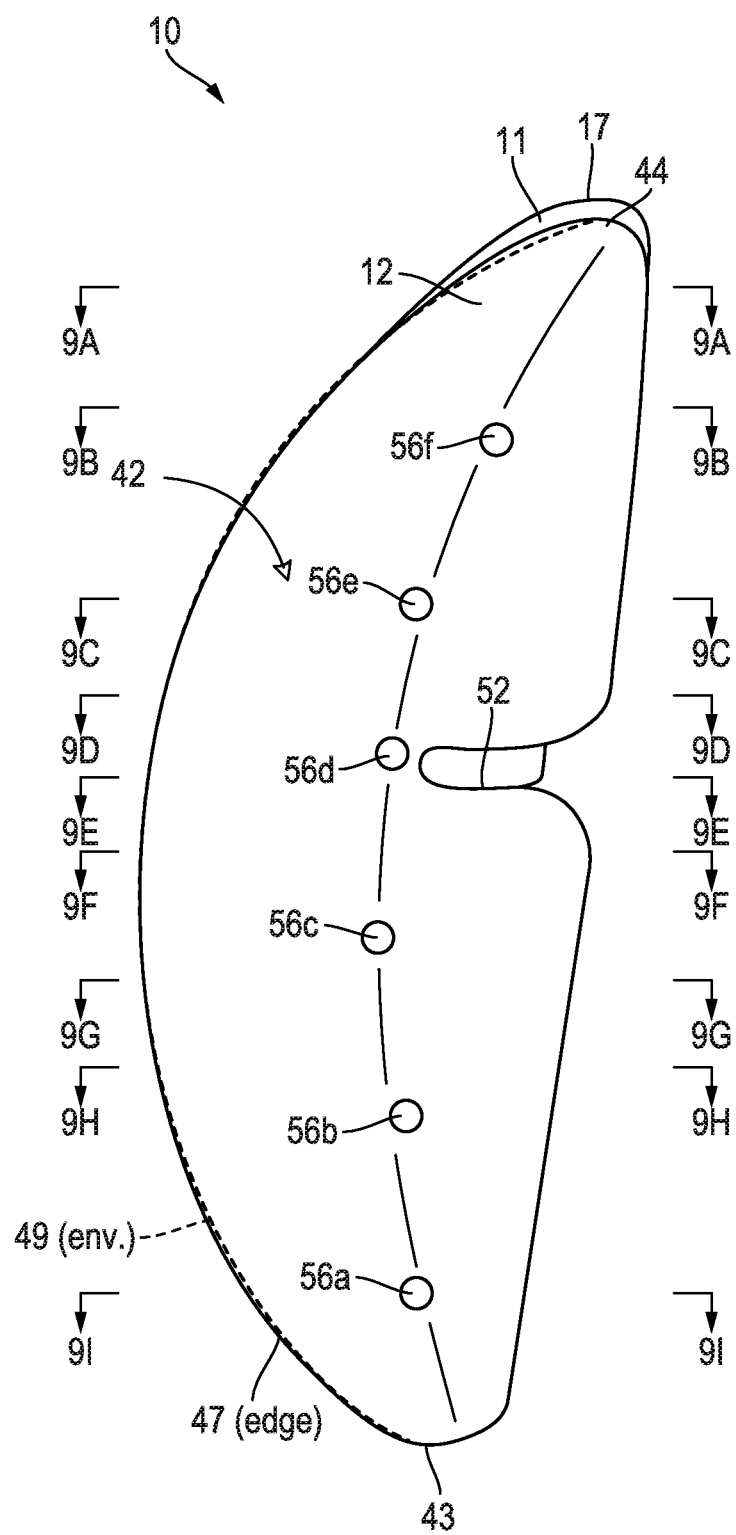
FIG. 4 is a bottom view of the arch support from FIG. 1.

FIG. 4 is a bottom view of arch support 10 and shows additional details of base plate 12. Base plate 12 has a bottom surface 42, a rear end 43, and a front end 44. The lateral side of base plate 12 terminates in a curved lateral edge 47 that extends from front end 44 to rear end 43. Edge 47 has a coinciding boundary 49, with edge 47 and boundary 49 being bowed and convex. The medial side of base plate 12 terminates in an upwardly-turned medial edge 48 (see FIG. 3) that extends between front end 44 and rear end 43. Medial edge 48 includes a single slot 52.

Figure 5:
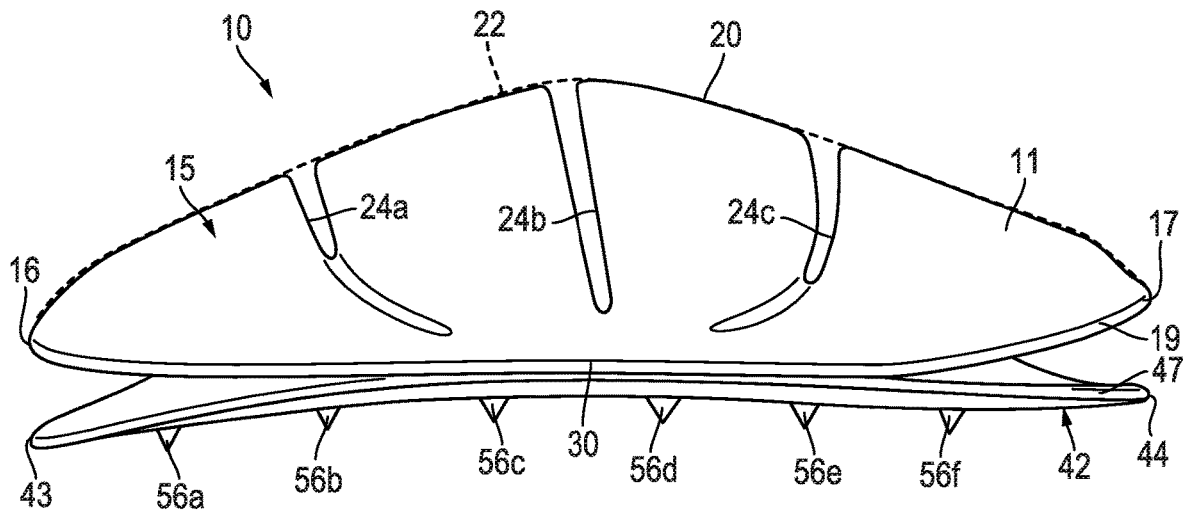
FIG. 5 is a lateral side view of the arch support from FIG. 1.

Bottom surface 42 further includes downward projections 56a through 56f. As seen in FIG. 5, a lateral side view of arch support 10, some or all of projections 56a through 56f may terminate in pointed ends. Projections 56a through 56 help to stabilize arch support 10 within a shoe by digging into a lasting element (e.g., a Strobel) or other component in the bottom of a shoe interior. As also seen in FIG. 5, envelope 22 of arch plate 11 medial edge 20 is bowed and convex.

Figure 6:
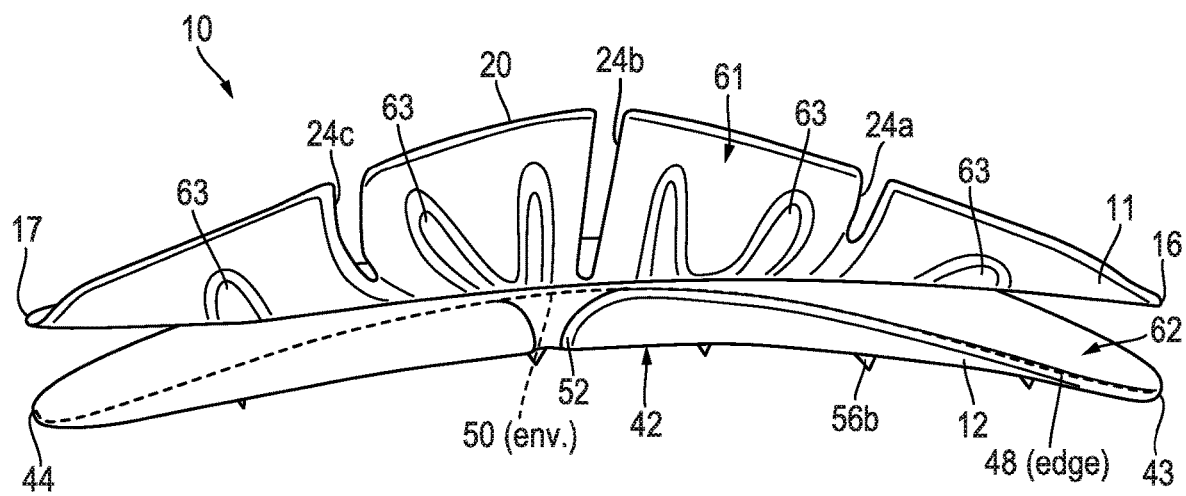
FIG. 6 is a medial side view of the arch support from FIG. 1.

FIG. 6 is a medial side view of arch support 10. Medial edge 48 of base plate 12 has an envelope 50 that is also bowed and convex. Also visible in FIG. 6 are a bottom surface 61 of arch plate 11 and a top surface 62 of base plate 12. As can be appreciated from FIGS. 5 and 6, slots 24a through 24c provide flexibility in upwardly extending regions of arch plate 11. In particular, each of slots 24a through 24c allows portions of arch plate 11 rearward of the slot to flatten or otherwise deform relative portions of arch plate 11 forward of the slot. This facilitates adaptation to a shape of a wearer's foot. The number, depth, and width of slots may be varied. Slot 52 similarly provides flexibility in upward extending portions of base plate 12 and facilitates adaptation to a shape of a wearer's foot. In some embodiments, including the embodiment of arch support 10, there are more slots in an arch plate than in a base plate. In some embodiments, base plate may also or alternatively be thicker than an arch plate.

In some embodiments, and as also shown in FIG. 6, an arch plate may have stiffening ribs 63. Each of ribs 63 is a medial-to-lateral extending region of increased thickness that helps to resist flattening of arch plate. In some embodiments, a top surface of an arch plate may also or alternatively include ribs similar to ribs 63. In some embodiments, an arch plate may include areas of reduced thickness in addition to or in conjunction with ribs and/or slots. For example, and as seen in FIGS. 3 and 5, top surface 15 of arch plate 11 includes grooves at the lateral/bottom ends of slots 24a through 24c. Similar grooves could be included in other regions of top surface 15 and/or of bottom surface 61. In some embodiments, ribs and/or grooves could be included on top and/or bottom surfaces of an arch support base plate.

Figure 7:
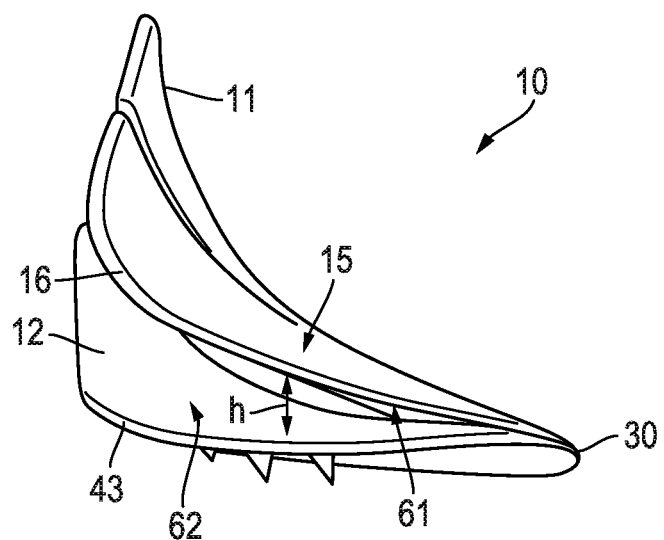
FIG. 7 is a rear end view of the arch support from FIG. 1.
Figure 8:
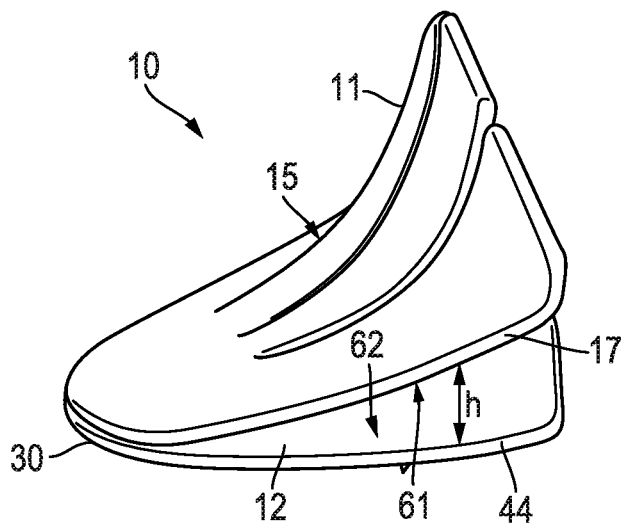
FIG. 8 is a front end view of the arch support from FIG. 1.

FIGS. 7 and 8 are respective rear end and front end views of arch support 10. As can be appreciated from FIGS. 7 and 8, bottom surface 61 of arch plate 11 faces and is separated from top surface 62 of base plate 12. Moreover, an extent of that separation (shown as a height h) increases toward the medial side of arch support 10. Through the connection between arch plate 11 and base plate 12 at joint 30, arch plate 11 is cantilevered relative to base plate 12. As a result of this structure and the material from which arch plate 11 is formed (described below), arch plate 11 is biased against flexion at joint 30 and along a width of arch plate 11 extending from joint 30 toward the medial side. Arch plate 11 and base plate 12 are biased against reduction of the separation distance h over that width. The amount of this separation bias varies based on, e.g., the elastic modulus of the material(s) used for arch plate 11, the thickness of arch plate 11, the presence of ribs, grooves, and slots, and width of arch plate 11 in the medial-lateral direction. The extent of joint 30 also affects the amount of separation bias. Lengthening joint 30 to extend along a longer portion of lateral edges 19 and 47 will increase the amount of separation bias, while shortening joint 30 to extend along a shorter portion of lateral edges 19 and 47 will decrease the amount of separation bias.

FIGS. 9A1 through 9I2 are partially schematic cross-sectional views across medial-lateral sectioning planes having the locations indicated in FIG. 4. For example, FIG. 9A1 is a partially schematic cross-sectional view from sectioning plane 9A-9A, FIG. 9B1 is a partially schematic cross-sectional view from sectioning plane 9B-9B, etc. The sectioning planes indicated are also frontal planes. FIGS. 9A2 through 9I2 are partially schematic enlarged area cross-sectional views taken across the same sectioning planes used to create 9A1 through 9I1 (e.g., FIG. 9A2 is a partially schematic enlarged area cross-sectional view from sectioning plane 9A-9A, etc.).

As seen in FIGS. 9A2 through 9I2, top surface 15 of arch plate 11 has medial-lateral contours that includes a lateral section 71_, a transitional section 72_, and a medial section 73_, with "_" being an appended lower case letter matching the upper case letter in the corresponding drawing figure (e.g., sections 71a, 72a, and 73a in FIG. 9A2). Medial-lateral contours of arch plate 11 bottom surface 61 include a lateral section 75_, a transitional section 76_, and a medial section 77_. Medial-lateral contours of top surface 62 of base plate 12 similarly include a lateral section 81_, a transitional section 82_, and a medial section 83_, with medial-lateral contours of base plate 12 bottom surface 42 including a lateral section 85_, a transitional section 86_, and a medial section 87_. Because of the locations of the sectioning planes corresponding to FIGS. 9A2, 9E2, and 9I2, transitional sections and/or medial sections may be absent for base plate 12.

For a given top surface 15 contour, lateral section 71_ has a relatively shallow inclination and medial section 73_ has a more steep inclination, with transitional section 72_ providing a rounded transition between the shallow and steep inclinations. In FIG. 9A2, for example, lateral section 71a has an overall average inclination (relative to the horizontal) of approximately 25 degrees and medial section 73a has an overall average inclination of approximately 57 degrees. A similar pattern can be seen in FIGS. 9B2 through 9I2, although the average inclinations of the lateral sections 71 and medial sections 73 in the sectioning planes of those figures may vary. The medial-lateral contours of arch plate 11 bottom surface 61, base plate 12 top surface 62, and base plate 12 bottom surface 42 also show similar patterns. In particular, those patterns include a relatively shallow inclination in the lateral section, a steeper inclination in the medial section, and a transitional section.

It is noted that the numerical values given above for the inclinations of lateral section 71a and medial section 73a are merely examples according to one embodiment. A cross-section taken at a similar location of an arch support according to a different embodiment may have different lateral section and medial section inclinations.

As can be further appreciated from FIGS. 9A2 through 9I2, medial-lateral cross sections of arch plate 11 are concave in the upward and lateral directions on the side of top surface 15. On the side of bottom surface 61, medial-lateral cross sections of arch plate 11 are convex in the downward and medial directions. Medial-lateral cross sections of base plate 12 are concave in the upward and lateral directions on the side of top surface 62. On the side of bottom surface 42, medial-lateral cross sections of base plate 12 are convex in the downward and medial directions.

Additional details of joint 30 can be seen in FIGS. 9C2 through 9H2. In particular, and as shown in those figures, arch plate 11 and base plate 12 may be integrally formed as a monolithic unit. In some such embodiments, arch plate 11 and base plate 12 may be formed of the same material. In other embodiments, different materials may be used for one or more portions of a monolithic arch support. For example, an arch support could be fabricated using a multi-shot molding process in which different material as sequentially injected into a mold, but which yields an arch support in which there is a continuous transition between materials. As another example, an arch support could be fabricated using 3D printing, laser sintering, or other rapid prototyping techniques and in which different materials are used for different portions of the arch support being fabricated FIGS. 9A2 through 9I2 are also labeled to show how, at each of the corresponding cross sections, an extent of separation (shown as a height h) between arch plate 11 bottom surface 61 and base plate 12 top surface 62 increases when going from the medial side to the lateral side. In FIG. 9A2, for example, height h3a is greater than height h2a, with height h2a being greater than height h1a.

Figure 9J:
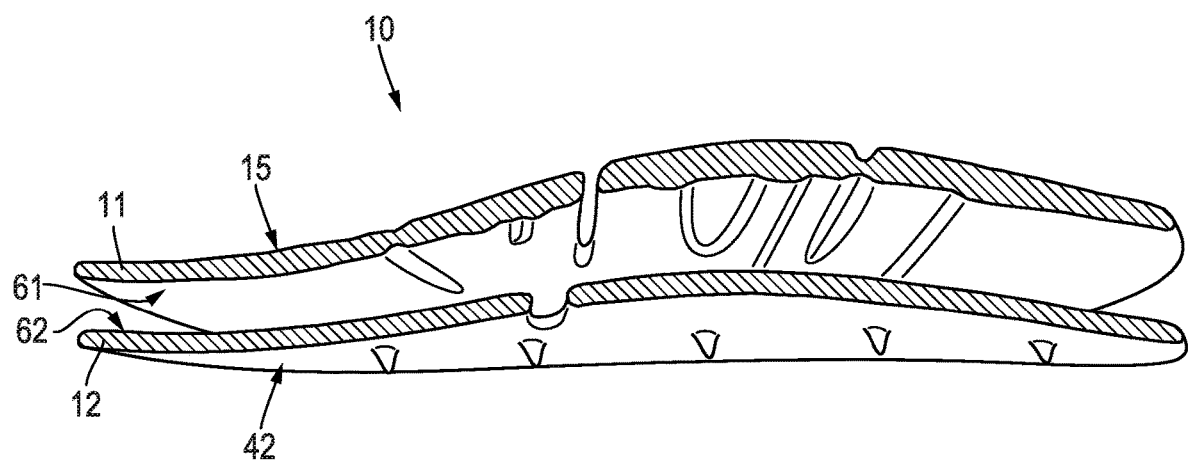
FIG. 9J is a cross-sectional view taken from the location indicated as 9J-9J in FIG. 3.

FIG. 9J is a partially schematic cross-sectional view across a vertical front-rear sectioning plane having the location indicated in FIG. 3. The sectioning plane indicated is also a sagittal plane. As seen in FIG. 9J, at least some contours of top surface 15 along front-to-rear cross sections include at least a portion that is convex in the upward direction. At least some contours of bottom surface 61 along front-to-rear cross sections include at least a portion that is concave in the downward direction. Similarly, at least some contours of top surface 62 along front-to-rear cross sections include at least a portion that is convex in the upward direction and at least some contours of bottom surface 42 along front-to-rear cross sections include at least a portion that is concave in the downward direction.

Figure 10:
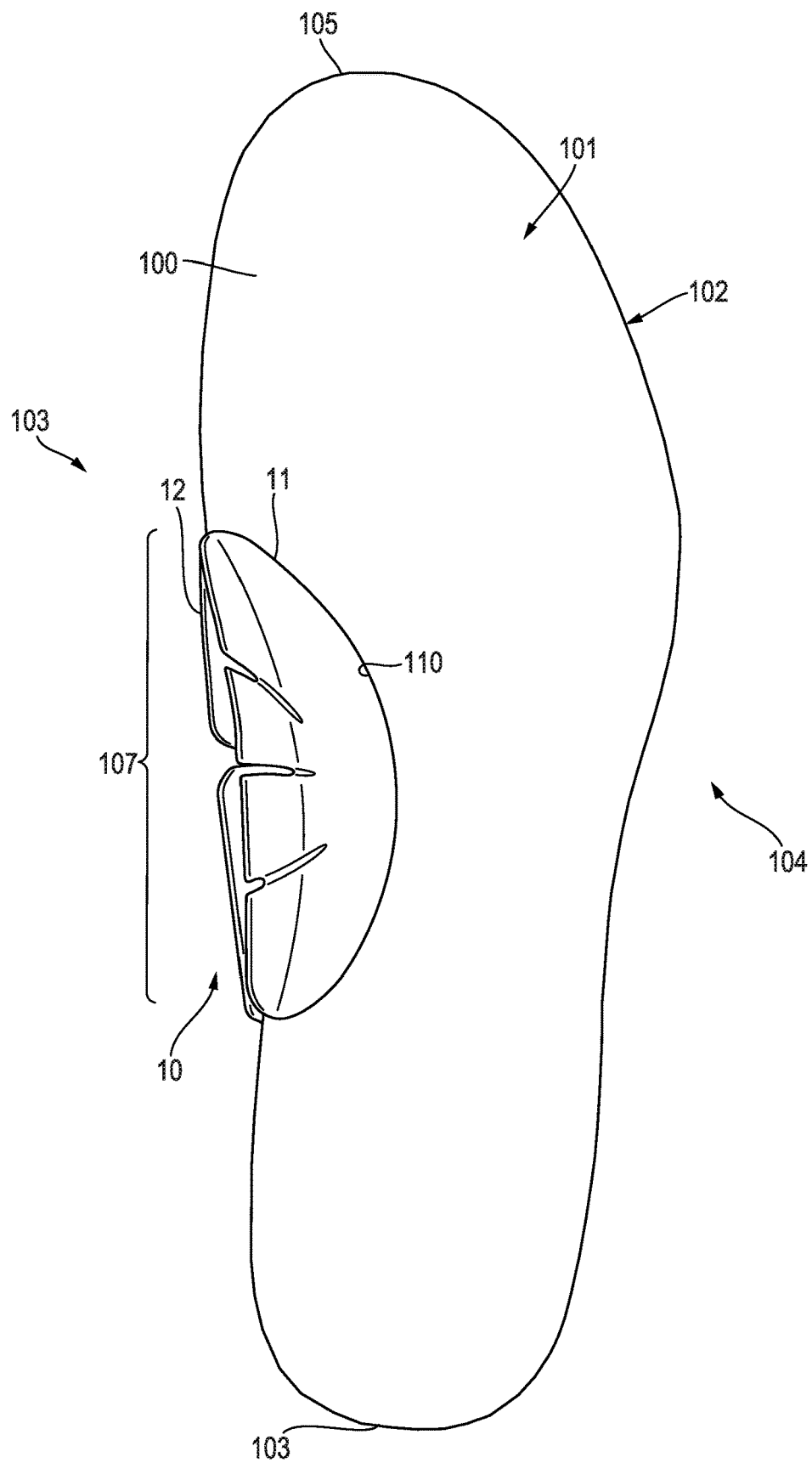
FIG. 10 is a top view of the arch support from FIG. 1, incorporated in a sock liner, according to some embodiments.

FIG. 10 is a top view of a sock liner 100 incorporating arch support 10. As used herein, "sock liner" refers to an element that can be inserted into a shoe and that rests in the bottom of a void formed by the upper. A sock liner, which may also be known as an insole, may in some embodiments be non-destructively removable from and replaceable into a shoe.

In some embodiments, and except as described herein, sock liner 10 may be of conventional construction. For example, sock liner may have a top surface 101 that is generally contoured to conform to the plantar surface of a wearer foot and may include material configured to absorb moisture and/or to provide slip resistance to a socked wearer foot. Sock liner 100 may further comprise one or more layers of foam or other compressible material beneath top surface 101. In some embodiments, a sock liner may be relatively thin and of generally constant thickness. In other embodiments, a sock liner may have increased thickness in one or more regions and/or include orthotic components in addition to an arch support according to various embodiments.

Sock liner 100 is shaped to fit within the lower portion of a void formed by a shoe upper, as further described below, and has a peripheral boundary 102 having the approximate shape of a footbed of a shoe into which sock liner 100 is to be inserted. Sock liner 100 includes a heel end 103, a lateral side 104, a toe end 105, and a medial side 106. Arch support 10 is installed in an arch region 107. In particular, and as is partially visible in FIG. 10, sock liner 100 includes an aperture 110 through which arch support 10 passes. The aperture 110 is formed in a medial midfoot region. A portion of base plate 12 upper surface 62 faces the underside of a bridging section of sock liner 100 on the medial side of aperture 110. A portion of arch plate 11 bottom surface 61 faces the top side of that bridging section of sock liner 100.

Figure 11:
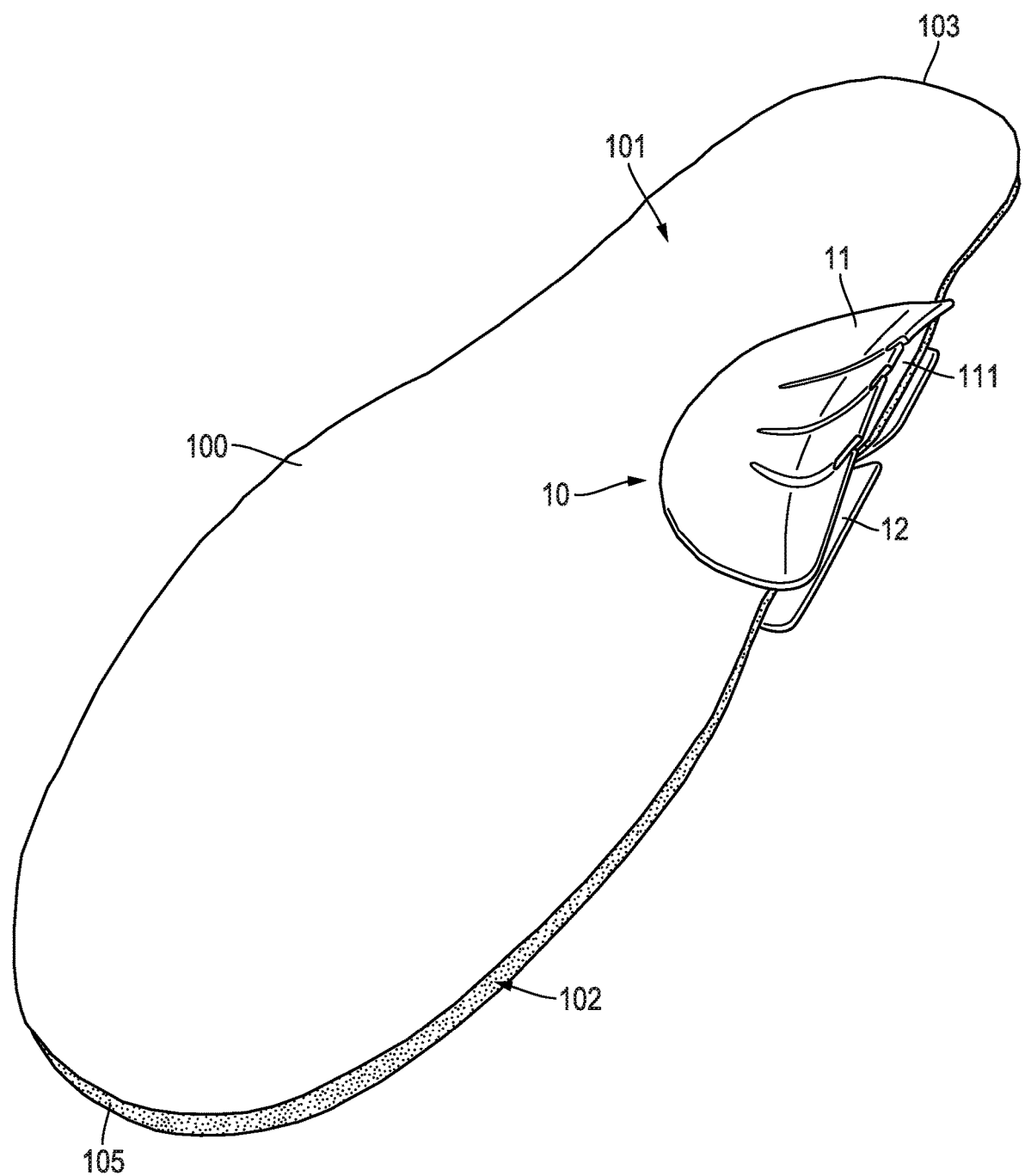
FIG. 11 is a medial side, top front perspective view of the arch support and sock liner from FIG. 10.

FIG. 11 is a medial side, top front perspective view of sock liner 100 incorporating arch support 10. A portion of bridging section 111 of sock liner 100 between base plate 12 and arch plate 11 is visible.

Figure 12:
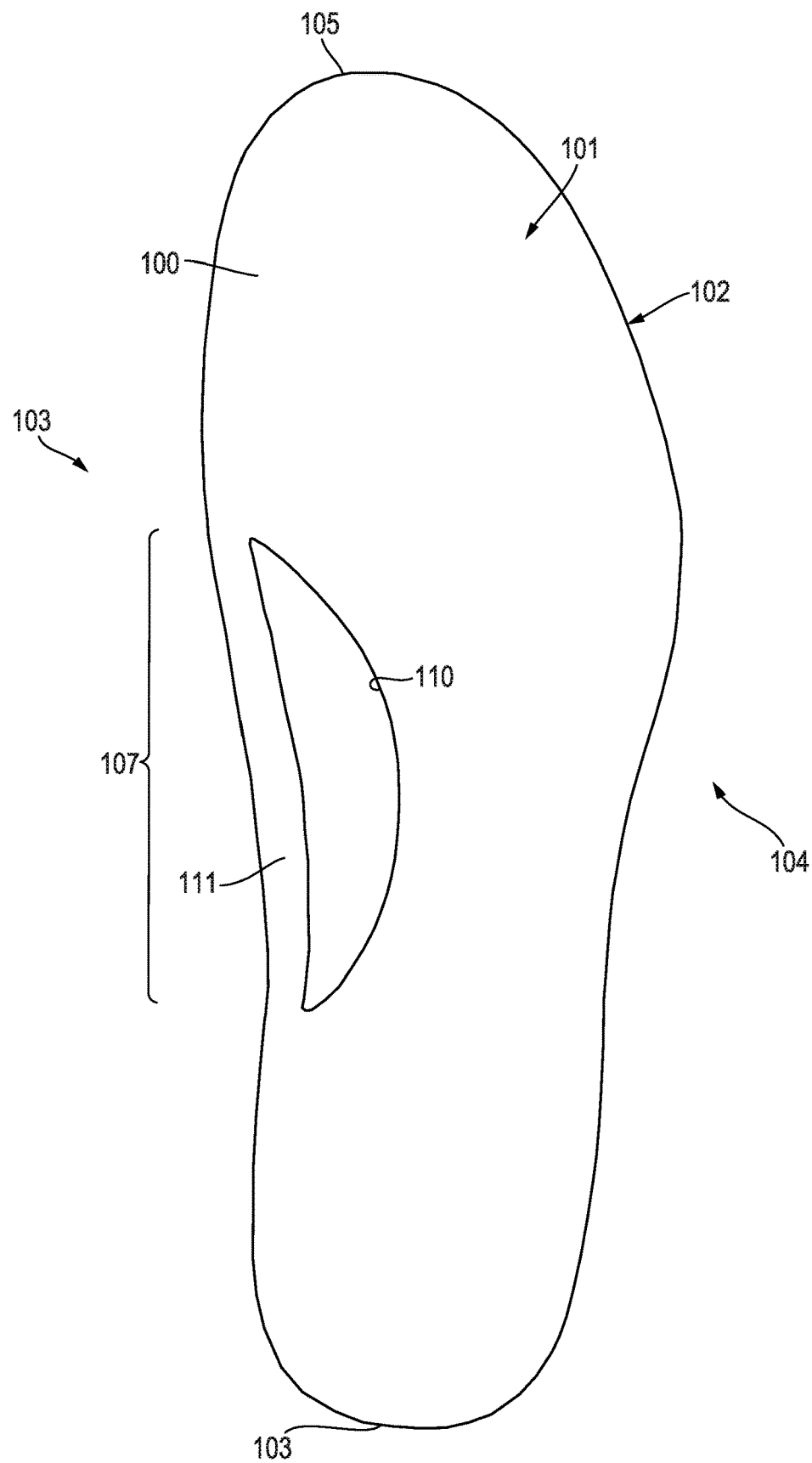
FIG. 12 is a top view of the sock liner from FIGS. 10 and 11.

FIG. 12 is a top view of sock liner 100 with arch support 10 removed. As seen in FIG. 12, aperture 110 is roughly crescent shaped. Bridging section 111 forms the medial side of aperture 110. Arch support 10 can be installed into sock liner 100 by inserting rear end 43 of base plate 12 into aperture 110 from the top of sock liner 100 and so that a portion of bridging section 111 is between base plate 12 and arch plate 11. The rear end of arch support 10 can then be moved toward the rear of aperture 110 until front end 44 of base plate 12 can be pushed through the front end of aperture 110. The position of arch support 10 can then be adjusted by moving forwardly, medially and/or laterally.

Figure 13:
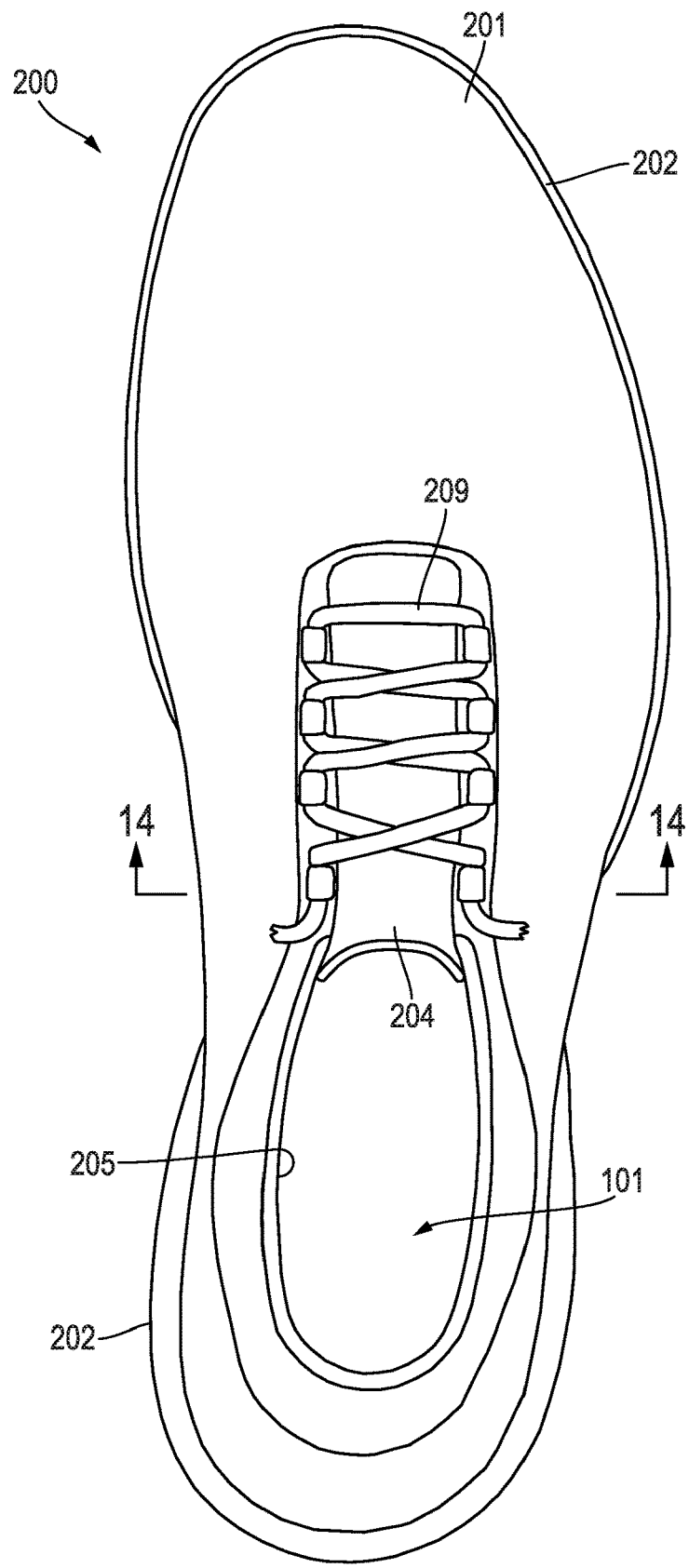
FIG. 13 is a top view of a shoe incorporating the sock liner and arch support of FIGS. 10 through 12.

FIG. 13 is a top view of a shoe 200 incorporating sock liner 100 and arch support 10. Shoe 200 includes an upper 201 and a sole structure 202. Upper 201 and sole structure 202 may have any of various conventional constructions. Upper 200 includes a tongue 204 and an ankle opening 205. Lace 209 may extend across an instep region. A portion of sock liner 100 top surface 101 is visible through ankle opening 205, but arch support 10 is obscured by upper 201 in FIG. 13.

Figure 14:
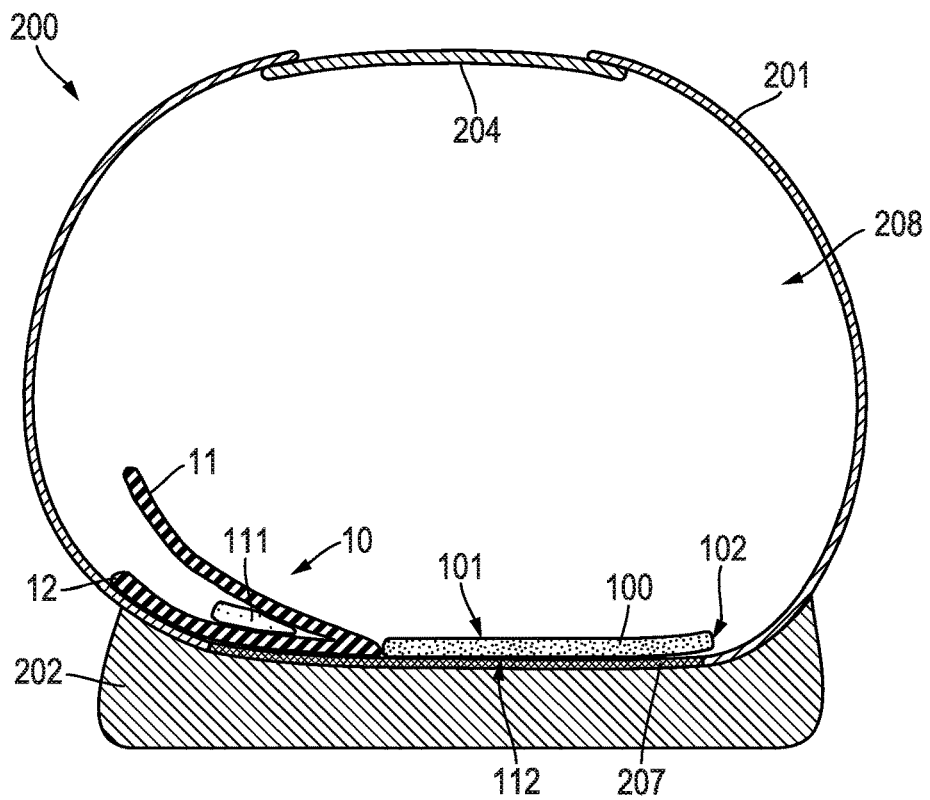
FIG. 14 is a partially schematic area cross-sectional view taken from the location indicated as 14-14 in FIG. 13.

FIG. 14 is a partially schematic area cross-sectional view of shoe 200 across a medial-lateral sectioning plane having the location indicated as 14-14 in FIG. 13. Visible in FIG. 14 are upper 201, tongue 204, and sole structure 202. As further shown in FIG. 14, a lasting element 207 is attached to bottom edges of upper 201 to enclose a void 208 within upper 201. Void 208 is sized and shaped to receive sock liner 100 and arch support 10 in the lower portion and to conform to a socked wearer foot in the remaining portion. Sole structure 202 may be attached to the underside of lasting element 207 and/or to upper 201 in a conventional manner.

With the exception of the regions where arch support 10 is installed, sock liner 100 fits within void 208 in a conventional manner. With the exception of bridging element 111, the underside 112 of sock liner 100 may rest directly against lasting element 207 and lower portions of the upper 201 interior surface. In some embodiments, underside 112 may be treated to create a tacky surface that adheres sock liner 100 to lasting element 207, but that allows nondestructive removal of sock liner 100. Peripheral boundary 102 of sock liner 100 generally follows the boundary of the shoe 200 footbed.

When shoe 200 is donned by a wearer, the wearer's foot pushes against top surface 15 of arch plate 11 and partially compresses arch support 10 by pushing arch plate 11 toward base plate 12. The resulting reactive force of arch plate 11 against the wearer foot provides support to the arch region of the wearer foot. The amount of reactive force can be tuned when fabricating arch support 10. In particular, the reactive force can be controlled by adjusting one or more of the features discussed above in connection with varying the amount of separation bias between arch plate 11 and base plate 12.

Bridging section 111 may also contribute to the separation bias between arch plate 11 and base plate 12. In some embodiments, and as indicated above, sock liner 100 may comprise a compressible foam material. Thus, and in addition to force necessary to deform arch plate 11, pushing arch plate 11 toward base plate 12 requires force to compress bridging section 111.

Figure 15:
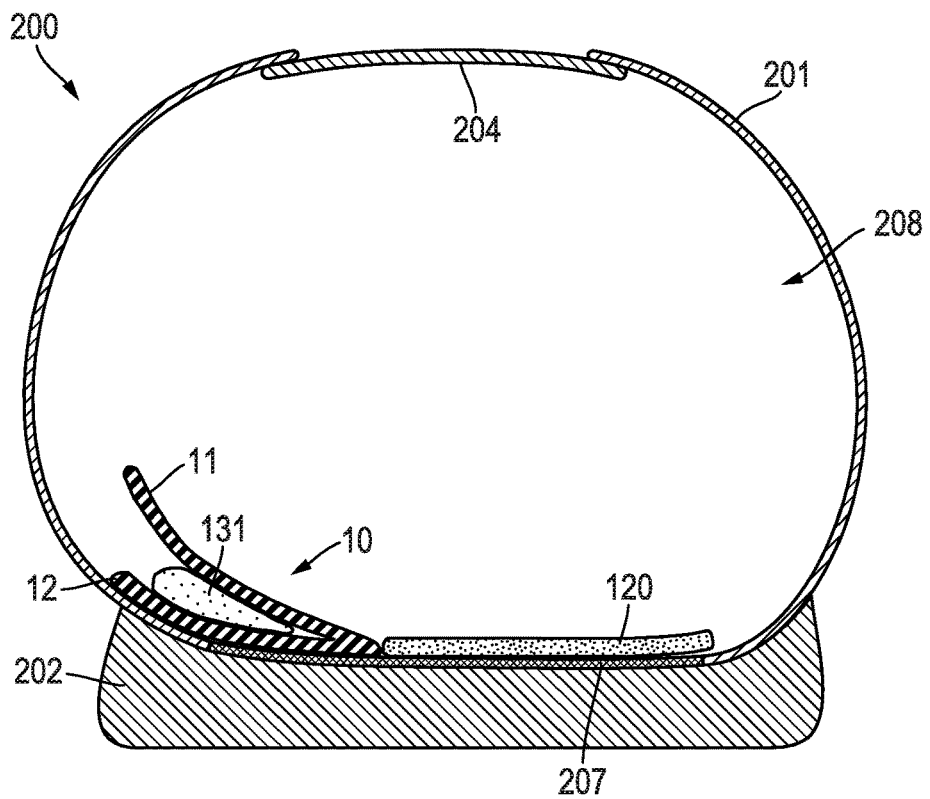
FIGS. 15 through 18 are partially schematic area cross-sectional views of shoes incorporating configurations according to additional embodiments.

In some embodiments, a sock liner may be fabricated so that a bridging section has extra thickness so as to further increase a contribution to separation bias. This is shown in FIG. 15, a partially schematic area cross-sectional view of shoe 200 from the same sectioning plane used for FIG. 14, but with sock liner 100 replaced with sock liner 120. Sock liner 120 includes a thicker bridging section 131, but is otherwise the same as sock liner 100.

Figure 16:
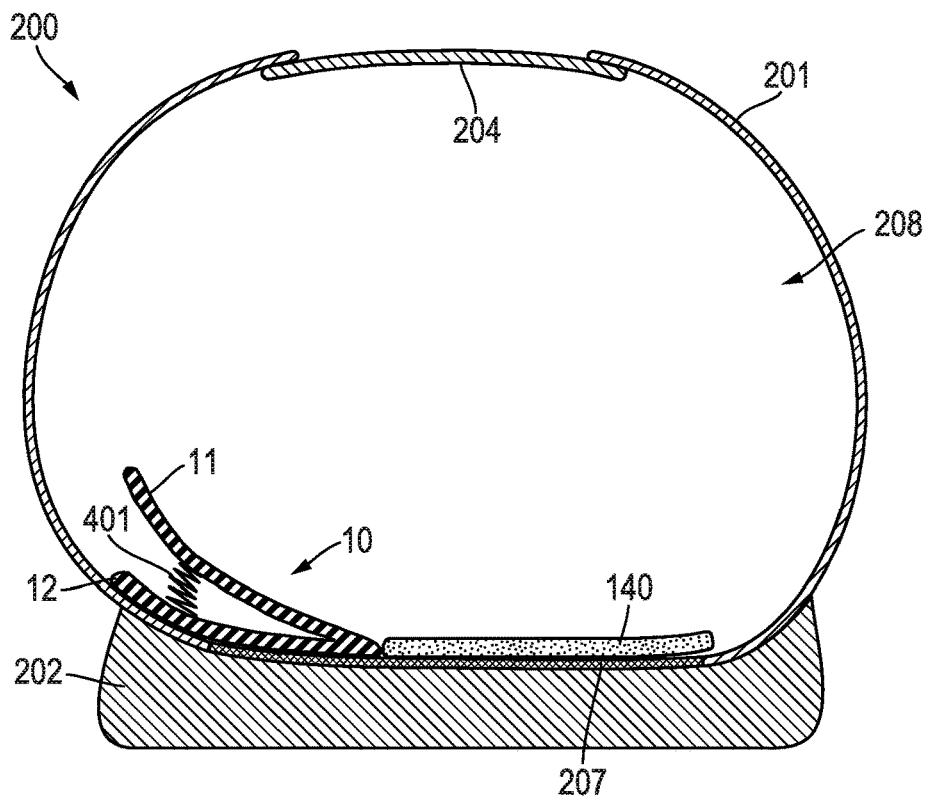
Figure 17:
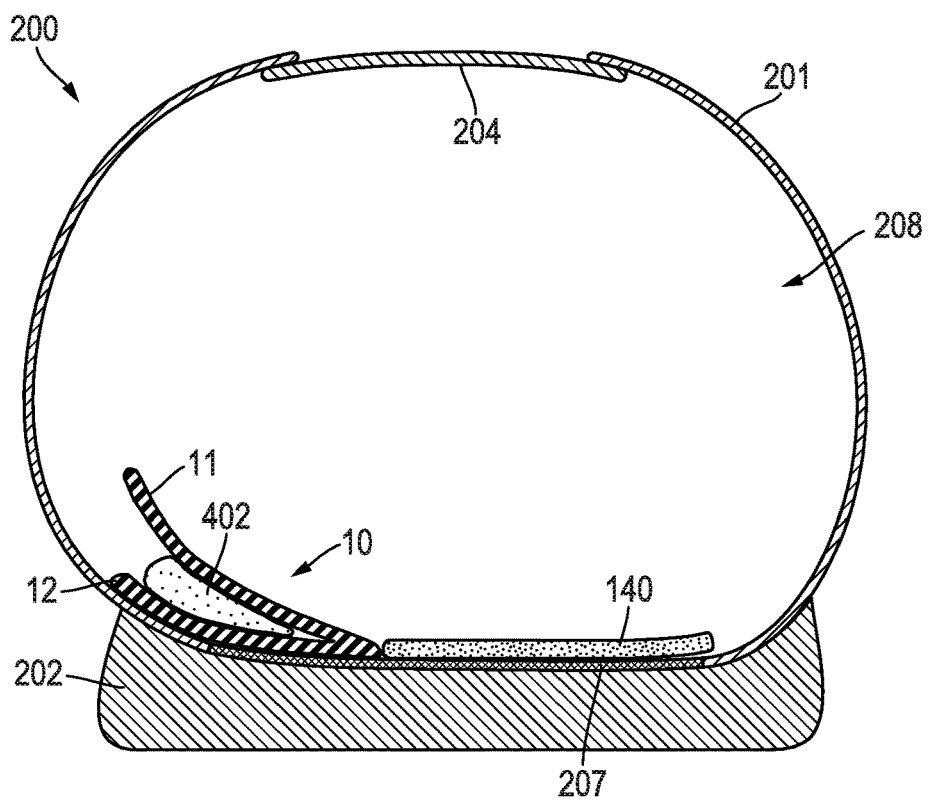
Figure 18:
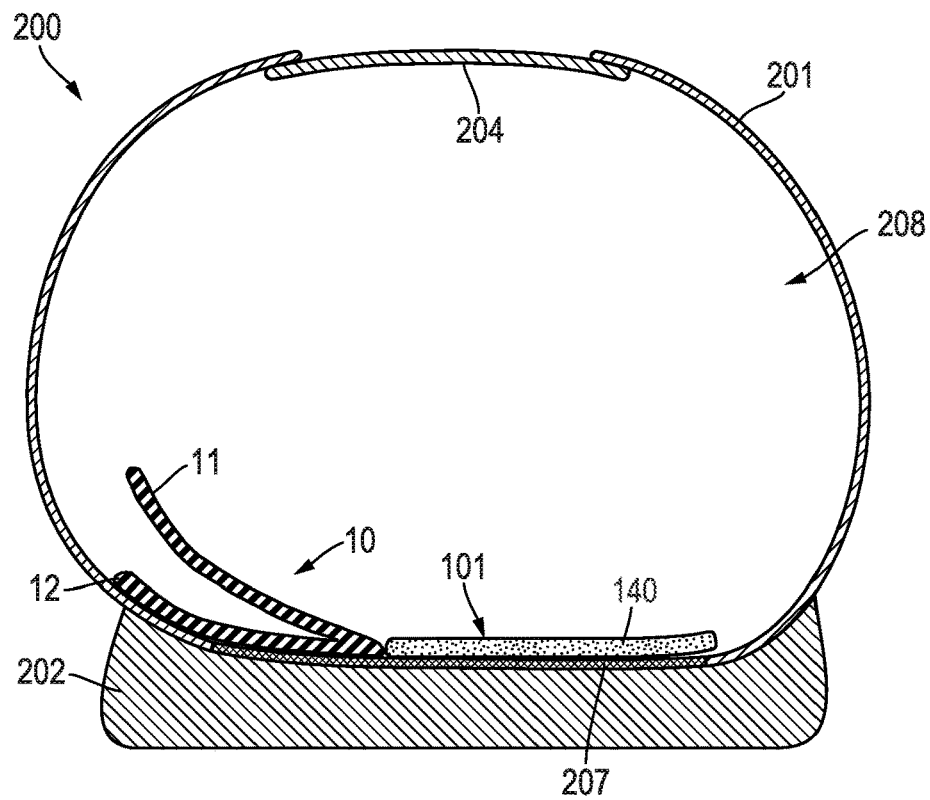

In some embodiments, other types of components may be used to increase separation bias between base plate 12 and arch plate 11. This is shown in FIG. 16, a partially schematic area cross-sectional view of shoe 200 from the same sectioning plane used for FIG. 14, but with sock liner 100 replaced with sock liner 140, and with a compression spring 401 located between base plate 12 and arch plate 11. Sock liner 140 lacks a bridging section, but is otherwise the same as sock liner 100. FIG. 17 is a partially schematic area cross-sectional view of shoe 200 from the same sectioning plane used for FIG. 14, but with sock liner 100 replaced with sock liner 140, and with a fluid-filled bladder 402 located between base plate 12 and arch plate 11. In some embodiments, and as shown in FIG. 18, there may be nothing between arch plate 11 and base plate 12. FIG. 18 is a partially schematic area cross-sectional view of shoe 200 from the same sectioning plane used for FIG. 14, but with sock liner 100 replaced with sock liner 140.

Arch supports such as arch support 100 and arch supports according to other embodiments can be customized to fit an individual wearer. Using dimensional data for that individual's foot, an arch support can be created using 3D printing, laser sintering, and/or another additive manufacturing process. Once fabricated, the arch support can be installed into a sock liner and the sock liner and arch support then placed into a shoe. In some embodiments, the sock liner may be a non-customized standard sock liner, or may be one of a limited number of available sock liner configurations. In still other embodiments, the customized arch support may be used with a sock liner that is also customized to the same wearer.

Figure 19:
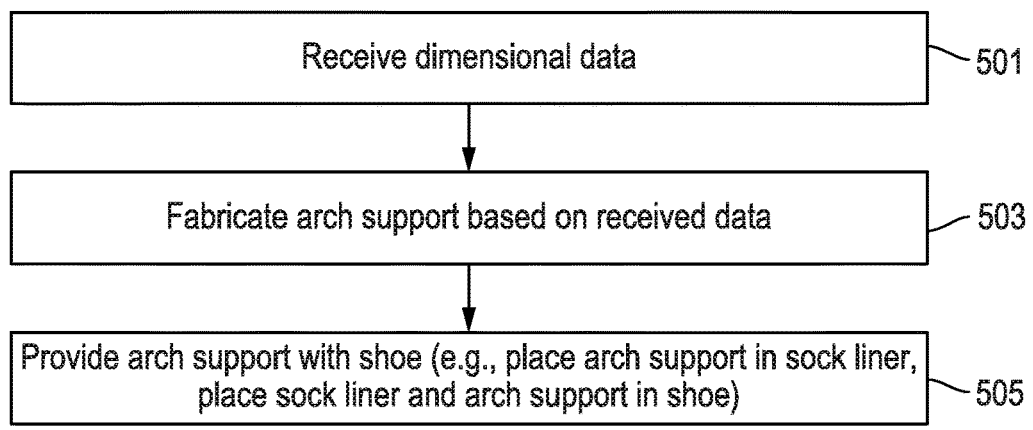
FIG. 19 is a flow chart showing steps in a method according to some embodiments.

FIG. 19 is a flow chart showing steps in a method according to some embodiments. In step 501, dimensional data regarding a shape of an individual's foot is received. In some embodiments, step 501 may include gathering foot shape data. In some embodiments, step 501 may include retrieving previously stored data. In step 503, an arch support is fabricated based on the received foot shape data. In some embodiments, and as described above, an arch support may be fabricated using 3D printing, laser sintering, and/or another additive manufacturing process. In step 505, the arch support and an article of footwear sized for the individual's foot are provided. In some embodiments, the providing may only consist of furnishing the arch support and the article of footwear to the individual or to another person, with the placement of the arch support into the article of footwear to be performed at a future time. In some embodiments, the providing may include placing the fabricated arch support in a sock liner and placing the sock liner with the arch support into the article of footwear. In some embodiments, the arch support and the sock liner may be separately installed in the shoe. In other embodiments, the shoe may lack a sock liner.

Arch supports such as arch support 10 and arch supports according to other embodiments can be fabricated from any of a variety of materials. Without limitation, examples of materials from which sock liners may be formed include thermoplastic polyurethane (TPU), polyurethane (PU), acrylonitrile butadiene styrene (ABS), polylactic acid (PLA), polyamide (Nylon), glass filled polyamide, and epoxy resins.

Arch supports according to at least some embodiments can be fabricated for any of a wide variety of shoe sizes. The overall length of an arch support according to various embodiments may vary based on, e.g., the size shoe for which the arch support is intended. In some embodiments, an arch support may have an overall length from forward-most point to rear-most point of between 2 and 6 inches.

Other embodiments include numerous additional variations on the components and combinations described above. Without limitation, such variations may include one or more of the following.

In some embodiments, an arch support may include an arch plate and a base plate that were fabricated as individual elements and subsequent attached at a joint using adhesives, mechanical fasteners, radio frequency (RF) welding, and/or other techniques.

In some embodiments, and instead of a joint used to make an arch plate cantilevered relative to a base plate, the joint between those plates may be pivoted. In particular, such a joint may allow the joined arch plate and base plate to move relative to one another similar to sides of a hinge. Separation bias between that arch plate and base plate can then be created using a bridging portion of a sock liner or other component(s) (e.g., a spring or a fluid filled bladder).

Arch supports according to some embodiments could be formed using multiple different methods. In some embodiments, for example, base plates may be fabricated using injection molding so as to create a limited number of standard base plates (e.g., a different base plate for each shoe size). An arch plate may then be fabricated, using 3D printing, laser sintering, or other rapid prototyping method, so as to be customized for a specific wearer. The custom arch plate may then be attached to the standard base at a joint using adhesives, mechanical fasteners, radio frequency (RF) welding, and/or other techniques.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. Any and all combinations, subcombinations and permutations of features from herein-described embodiments are the within the scope of the invention. In the claims, a reference to a potential or intended wearer or a user of a component does not require actual wearing or using of the component or the presence of the wearer or user as part of the claim.

The invention claimed is:

1. An article of footwear comprising:
   an upper;
   a sock liner disposed within the upper; and
   an arch support disposed in a medial midfoot region of the upper, the arch support including a base plate and an arch plate, wherein:
   the base plate includes a medial edge and a lateral edge, and the arch plate includes a medial edge and a lateral edge;
   the arch plate is attached to the base plate along at least a portion of their respective lateral edges;
   a bottom surface of the arch plate extending away from its lateral edge and toward its medial edge forms an acute angle relative to a top surface of the base plate, an extent of a separation between the arch plate bottom surface and the base plate top surface increasing from the respective lateral edges toward the respective medial edges of the arch plate and the base plate;
   the sock liner includes an aperture formed in the medial midfoot region; and
   the arch support is positioned in the aperture such that at least a portion of a medial side of the sock liner is disposed between the base plate top surface and the arch plate bottom surface.

2. The article of footwear of claim 1, wherein:
   an envelope of the base plate lateral edge is convex, and an envelope of the base plate medial edge is convex.

3. The article of footwear of claim 1, wherein the arch plate is cantilevered relative to the base plate at their respective lateral edges.

4. The article of footwear of claim 1, wherein medial-lateral cross sections of the arch plate are concave at an arch plate top surface and convex at the arch plate bottom surface.

5. The article of footwear of claim 4, wherein medial-lateral cross sections of the base plate are concave at the base plate top surface and convex at a bottom surface of the base plate.

6. The article of footwear of claim 1, wherein cross sections of the arch plate in vertical front-rear planes are convex for at least part of an arch plate top surface and concave for at least part of the arch plate bottom surface.

7. The article of footwear of claim 6, wherein cross sections of the base plate in vertical front-rear planes are convex for at least part of the base plate top surface and concave for at least part of a bottom surface of the base plate.

8. The article of footwear of claim 1, wherein a bottom surface of the base plate includes one or more downwardly-extending projections, and wherein each of the one or more downwardly-extending projections terminates in a pointed end.

9. The article of footwear of claim 1, wherein the arch plate includes at least one arch plate slot extending into the arch plate from an envelope of an arch plate medial edge.

10. The article of footwear of claim 9, wherein the base plate includes at least one base plate slot extending into the base plate from an envelope of a base plate medial edge, and wherein there are more arch plate slots than base plate slots.

11. The article of footwear of claim 1, wherein the arch plate and the base plate are integrally formed as a monolithic unit.

12. The article of footwear of claim 1, wherein the arch plate is biased against flexion where the arch plate is attached to the base plate and along a width of the arch plate extending from where the arch plate is attached to the base plate toward the medial side.

13. The article of footwear of claim 1, wherein an overall front to rear length of the arch support is between 2 and 6 inches.

14. The article of footwear of claim 1, wherein a joint formed where the arch plate is attached to the base plate is positioned within the aperture.

\* \* \* \* \*